United States Patent
Beroz et al.

(10) Patent No.: US 7,176,506 B2
(45) Date of Patent: Feb. 13, 2007

(54) HIGH FREQUENCY CHIP PACKAGES WITH CONNECTING ELEMENTS

(75) Inventors: Masud Beroz, Livermore, CA (US); Michael Warner, San Jose, CA (US); Lee Smith, Frisco, TX (US); Glenn Urbish, Coral Springs, FL (US); Teck-Gyu Kang, San Jose, CA (US); Jae M. Park, San Jose, CA (US); Yoichi Kubota, Pleasanton, CA (US)

(73) Assignee: Tessera, Inc., San Jose, CA (US)

( * ) Notice: Subject to any disclaimer, the term of this patent is extended or adjusted under 35 U.S.C. 154(b) by 0 days.

(21) Appl. No.: 10/746,810

(22) Filed: Dec. 24, 2003

(65) Prior Publication Data

US 2004/0238857 A1 Dec. 2, 2004

Related U.S. Application Data

(63) Continuation-in-part of application No. PCT/US02/27509, filed on Aug. 28, 2002, and a continuation-in-part of application No. 10/210,160, filed on Aug. 1, 2002, now Pat. No. 6,856,007.

(60) Provisional application No. 60/462,170, filed on Apr. 11, 2003, provisional application No. 60/449,673, filed on Feb. 25, 2003, provisional application No. 60/315,408, filed on Aug. 28, 2001.

(51) Int. Cl.
 *H01L 27/148* (2006.01)
(52) U.S. Cl. ................. 257/232; 257/232; 257/723; 257/E23.066
(58) Field of Classification Search ................. 257/666, 257/687, 723, 724

See application file for complete search history.

(56) References Cited

U.S. PATENT DOCUMENTS

| | | | |
|---|---|---|---|
| 4,774,630 A | 9/1988 | Reisman et al. | |
| 4,827,376 A | 5/1989 | Voss | |
| 5,148,265 A | 9/1992 | Khandros et al. | |
| 5,148,266 A | 9/1992 | Khandros et al. | |
| 5,187,122 A | 2/1993 | Bonis | |

(Continued)

FOREIGN PATENT DOCUMENTS

| | | |
|---|---|---|
| JP | 05-04762 | 2/1993 |
| WO | WO-97/11588 A1 | 3/1997 |

*Primary Examiner*—Andy Huynh
*Assistant Examiner*—Thinh T Nguyen
(74) *Attorney, Agent, or Firm*—Lerner, David, Littenberg, Krumholz & Mentlik, LLP

(57) ABSTRACT

A radio frequency chip package is formed by assembling a connecting element such as a circuit board or flexible circuit tape having chips thereon with a bottom plane element such as a lead frame incorporating a large thermally-conductive plate and leads projecting upwardly from the plane of the plate. The assembly step places the rear surfaces of the chips on the bottom side of the connecting element into proximity with the thermal conductor and joins the conductive traces on the connecting element with the leads. The resulting assembly is encapsulated, leaving terminals at the bottom ends of the leads exposed. The encapsulated assembly may be surface-mounted to a circuit board. The leads provide robust electrical connections between the connecting element and the circuit board.

18 Claims, 18 Drawing Sheets

U.S. PATENT DOCUMENTS

| | | | |
|---|---|---|---|
| 5,198,963 A * | 3/1993 | Gupta et al. | 361/715 |
| 5,285,352 A | 2/1994 | Pastore et al. | |
| 5,382,829 A | 1/1995 | Inoue | |
| 5,390,844 A | 2/1995 | Distefano et al. | |
| 5,398,863 A | 3/1995 | Grube et al. | |
| 5,438,305 A | 8/1995 | Hikita et al. | |
| 5,473,190 A | 12/1995 | Inoue et al. | |
| 5,486,720 A | 1/1996 | Kierse | |
| 5,491,302 A | 2/1996 | Distefano et al. | |
| 5,518,964 A | 5/1996 | DiStefano et al. | |
| 5,530,288 A | 6/1996 | Stone | |
| 5,536,909 A | 7/1996 | DiStefano et al. | |
| 5,557,501 A | 9/1996 | DiStefano et al. | |
| 5,576,680 A | 11/1996 | Ling | |
| 5,608,262 A | 3/1997 | Degani et al. | |
| 5,629,239 A | 5/1997 | DiStefano et al. | |
| 5,629,241 A | 5/1997 | Matloubian et al. | |
| 5,633,785 A | 5/1997 | Parker et al. | |
| 5,642,261 A | 6/1997 | Bond et al. | |
| 5,659,952 A | 8/1997 | Kovac et al. | |
| 5,677,569 A | 10/1997 | Choi et al. | |
| 5,679,977 A | 10/1997 | Khandros et al. | |
| 5,688,716 A | 11/1997 | DiStefano et al. | |
| 5,706,174 A | 1/1998 | Distefano et al. | |
| 5,717,245 A | 2/1998 | Pedder | |
| 5,747,870 A | 5/1998 | Pedder | |
| 5,757,074 A | 5/1998 | Matloubian et al. | |
| 5,766,987 A | 6/1998 | Mitchell et al. | |
| 5,787,581 A | 8/1998 | DiStefano et al. | |
| 5,798,286 A | 8/1998 | Faraci et al. | |
| 5,821,609 A | 10/1998 | DiStefano et al. | |
| 5,830,782 A | 11/1998 | Smith et al. | |
| 5,869,887 A | 2/1999 | Urushima | |
| 5,869,894 A | 2/1999 | Degani et al. | |
| 5,886,393 A | 3/1999 | Merrill et al. | |
| 5,892,417 A | 4/1999 | Johnson et al. | |
| 5,895,972 A | 4/1999 | Paniccia | |
| 5,905,639 A | 5/1999 | Warren | |
| 5,913,109 A | 6/1999 | Distefano et al. | |
| 5,915,752 A | 6/1999 | DiStefano et al. | |
| 5,918,112 A | 6/1999 | Shah et al. | |
| 5,929,517 A | 7/1999 | Distefano et al. | |
| 5,973,391 A | 10/1999 | Bischoff et al. | |
| 5,976,913 A | 11/1999 | Distefano et al. | |
| 6,005,466 A | 12/1999 | Pedder | |
| 6,037,659 A | 3/2000 | Weixel | |
| 6,046,076 A | 4/2000 | Mitchell et al. | |
| 6,049,972 A | 4/2000 | Link et al. | |
| 6,054,756 A | 4/2000 | DiStefano et al. | |
| 6,075,289 A | 6/2000 | Distefano | |
| 6,081,035 A | 6/2000 | Warner et al. | |
| 6,093,888 A | 7/2000 | Laureanti et al. | |
| 6,104,272 A | 8/2000 | Yamamoto et al. | |
| 6,124,546 A | 9/2000 | Hayward et al. | |
| 6,133,626 A | 10/2000 | Hawke et al. | |
| 6,156,980 A | 12/2000 | Peugh et al. | |
| 6,165,814 A | 12/2000 | Wark et al. | |
| 6,169,328 B1 | 1/2001 | Mitchell et al. | |
| 6,181,015 B1 | 1/2001 | Gotoh et al. | |
| 6,194,774 B1 | 2/2001 | Cheon | |
| 6,214,644 B1 | 4/2001 | Glenn | |
| 6,218,729 B1 | 4/2001 | Zavrel, Jr. et al. | |
| 6,228,686 B1 | 5/2001 | Smith et al. | |
| 6,229,200 B1 | 5/2001 | Mclellan et al. | |
| 6,238,949 B1 | 5/2001 | Nguyen et al. | |
| 6,238,950 B1 | 5/2001 | Howser et al. | |
| 6,249,039 B1 | 6/2001 | Harvey et al. | |
| 6,252,778 B1 | 6/2001 | Tonegawa et al. | |
| 6,255,714 B1 | 7/2001 | Kossives et al. | |
| 6,274,937 B1 | 8/2001 | Ahn et al. | |
| 6,281,570 B1 | 8/2001 | Kameyama et al. | |
| 6,292,086 B1 | 9/2001 | Chu | |
| 6,309,910 B1 | 10/2001 | Haba et al. | |
| 6,310,386 B1 | 10/2001 | Shenoy | |
| 6,323,735 B1 | 11/2001 | Welland et al. | |
| 6,326,696 B1 | 12/2001 | Horton et al. | |
| 6,329,715 B1 | 12/2001 | Hayashi | |
| 6,344,688 B1 | 2/2002 | Wang | |
| 6,353,263 B1 | 3/2002 | Dotta et al. | |
| 6,362,525 B1 | 3/2002 | Rahim | |
| 6,377,464 B1 | 4/2002 | Hashemi et al. | |
| 6,387,747 B1 | 5/2002 | Cha et al. | |
| 6,492,194 B1 | 12/2002 | Bureau et al. | |
| 6,492,201 B1 | 12/2002 | Haba | |
| 6,493,240 B2 * | 12/2002 | Broglia et al. | 361/803 |
| 6,498,099 B1 | 12/2002 | McLellan et al. | |
| 6,521,987 B1 | 2/2003 | Glenn et al. | |
| 6,550,664 B2 | 4/2003 | Bradley et al. | |
| 6,583,513 B1 | 6/2003 | Utagikar et al. | |
| 6,621,163 B2 | 9/2003 | Weekamp et al. | |
| 6,657,296 B2 | 12/2003 | Ho et al. | |
| 6,670,206 B2 | 12/2003 | Kim et al. | |
| 6,670,215 B2 | 12/2003 | Miyazaki et al. | |
| 6,678,167 B1 * | 1/2004 | Degani et al. | 361/760 |
| 6,710,456 B1 | 3/2004 | Jiang et al. | |
| 2001/0033478 A1 | 10/2001 | Ortiz et al. | |
| 2002/0017699 A1 | 2/2002 | Shenoy | |
| 2002/0074668 A1 | 6/2002 | Hofstee et al. | |
| 2002/0195700 A1 | 12/2002 | Li | |
| 2003/0001252 A1 | 1/2003 | Ku et al. | |
| 2003/0047797 A1 | 3/2003 | Kuan et al. | |
| 2004/0041249 A1 | 3/2004 | Tsai et al. | |

\* cited by examiner

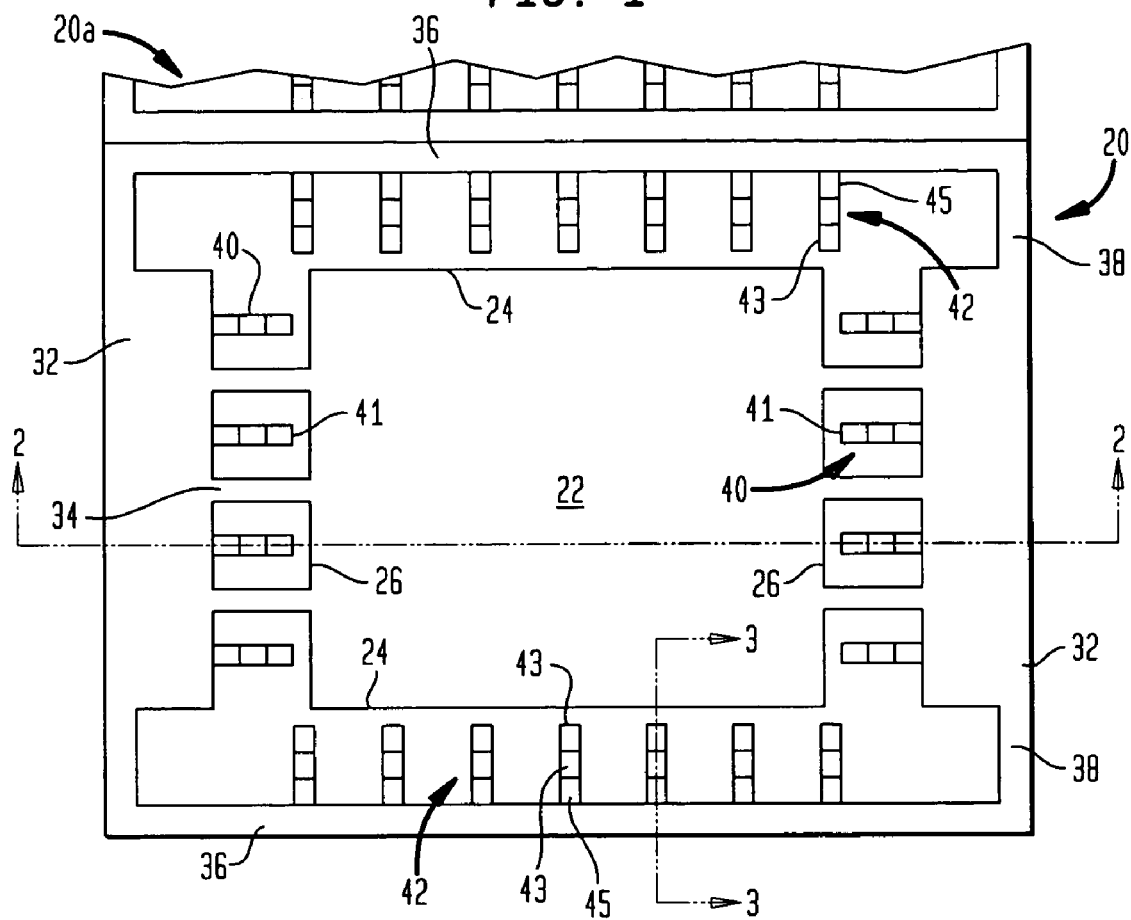
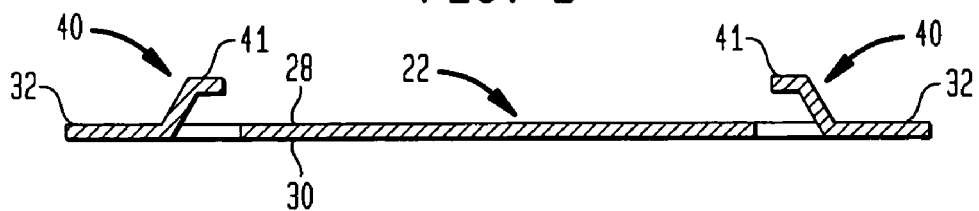
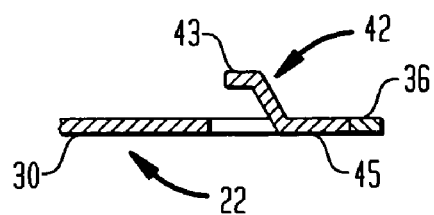

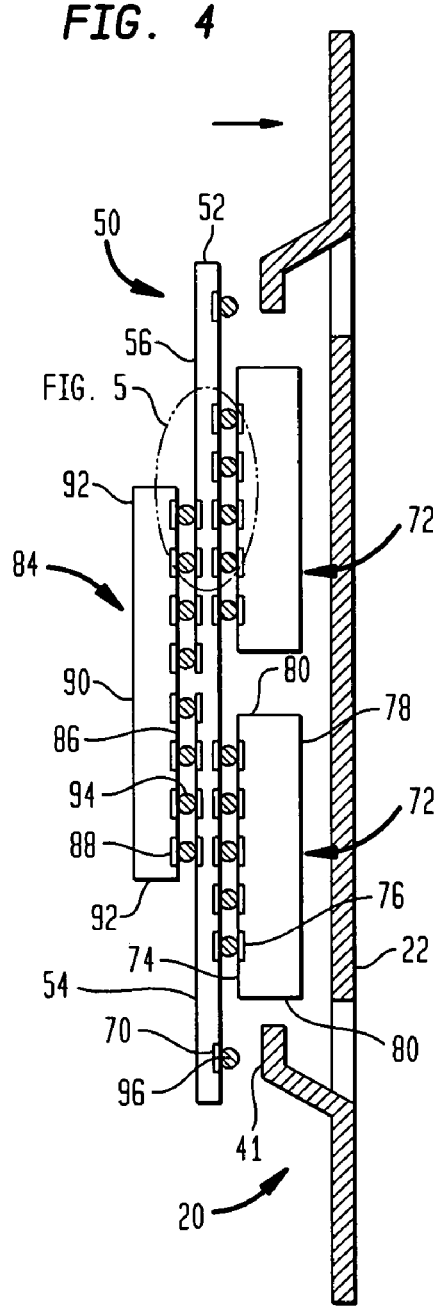
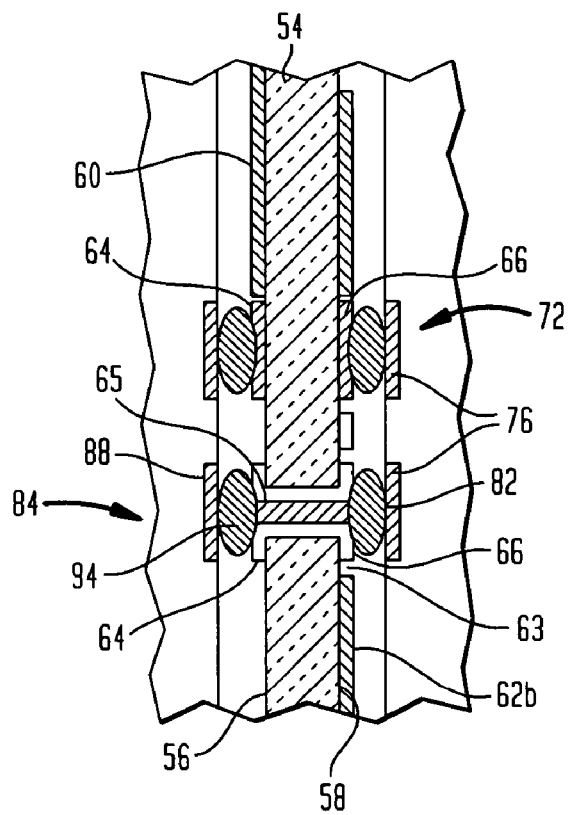

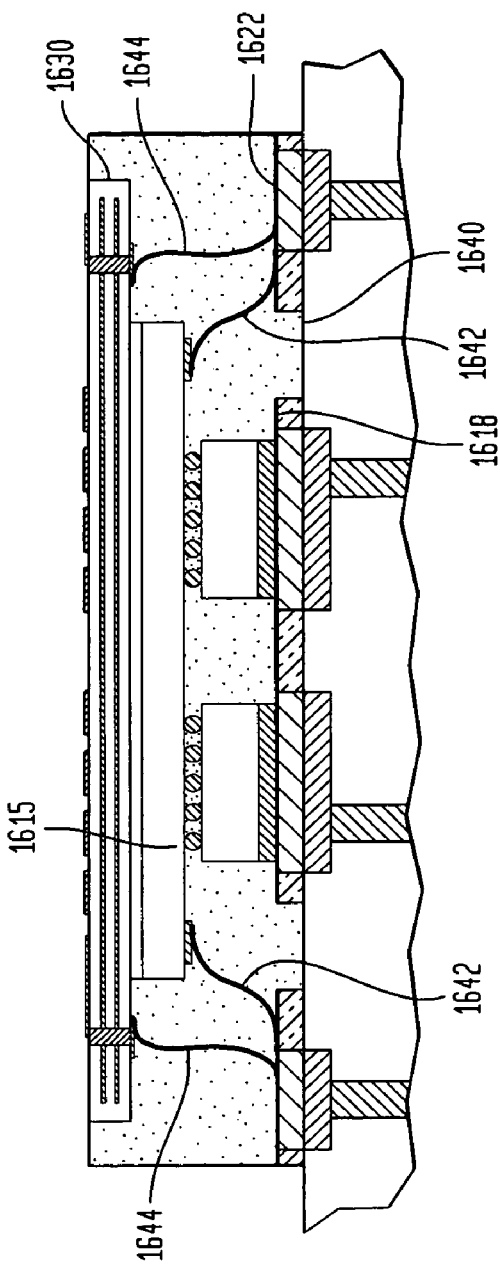
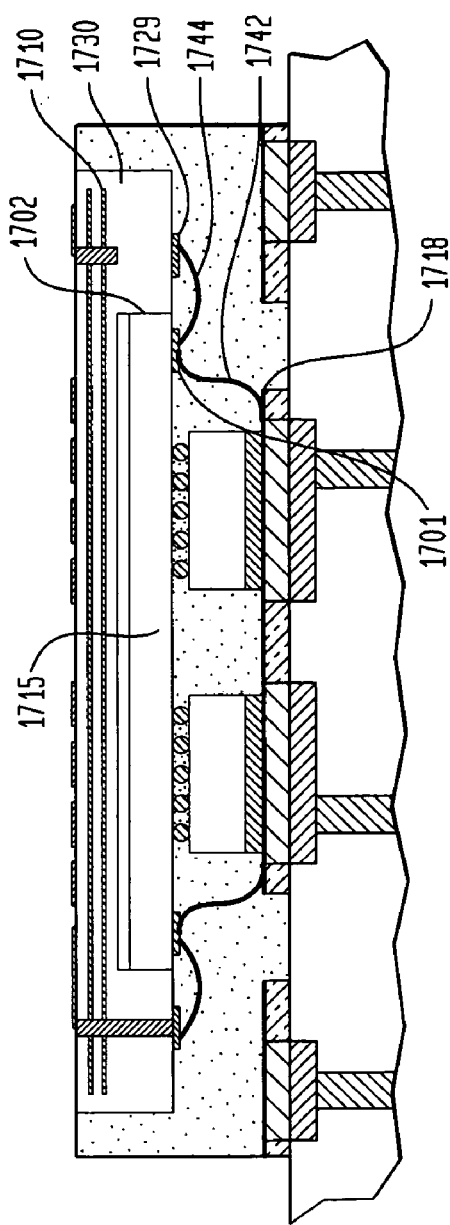

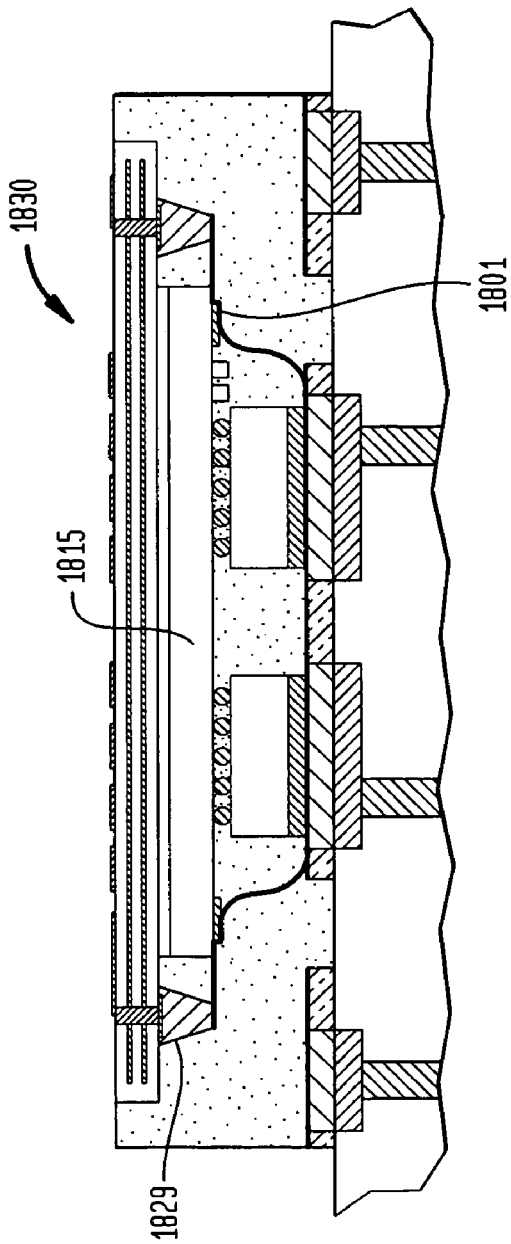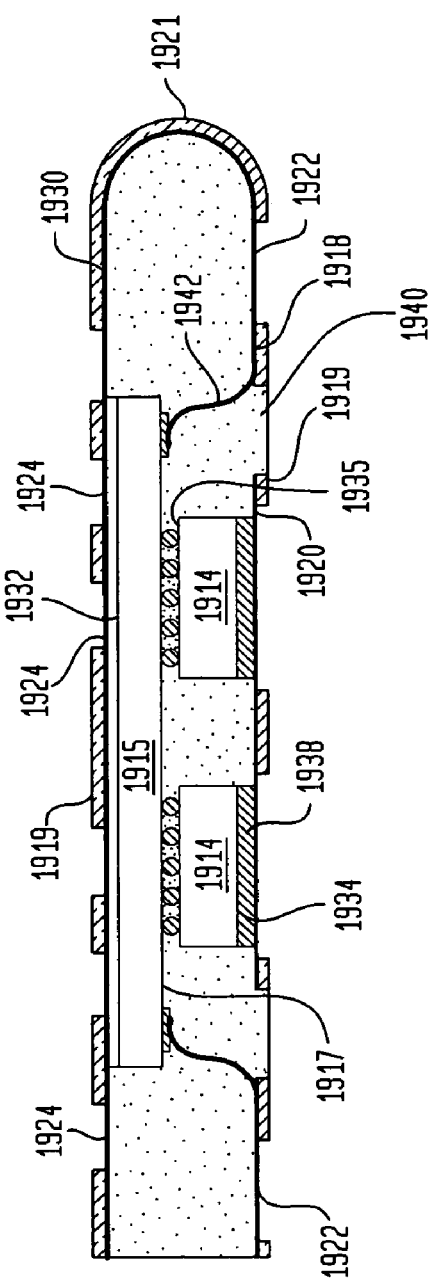

HIGH FREQUENCY CHIP PACKAGES WITH CONNECTING ELEMENTS

CROSS-REFERENCE TO RELATED APPLICATIONS

The present application is a continuation-in-part of commonly assigned, co-pending international application PCT/US02/27509, filed Aug. 28, 2002, (hereinafter, the "'509 application") which designates the United States. Said international application claims the benefit of U.S. Provisional Patent Application No. 60/315,408 filed Aug. 28, 2001. Said international application is also a continuation-in-part of U.S. patent application Ser. No. 10/210,160, filed Aug. 1, 2002 now U.S. Pat. No. 6,856,007, which application also claims the benefit of said U.S. Provisional Patent Application No. 60/315,408. The present application is also a continuation-in-part of said U.S. patent application Ser. No. 10/210,160, filed Aug. 1, 2002. The present application also claims the benefit of U.S. Provisional Patent Application No. 60/449,673 filed Feb. 25, 2003 and U.S. Provisional Patent Application No. 60/462,170 filed Apr. 11, 2003. The disclosures of all of the aforesaid applications are incorporated by reference herein.

BACKGROUND OF THE INVENTION

Semiconductor chips are commonly provided in packages which facilitate handling of the chip during manufacture and during mounting of the chip on an external substrate such as a circuit board or other circuit panel. For example, many semiconductor chips are provided in packages suitable for surface mounting. These packages typically have an external structure with exposed terminals on a bottom face of the structure. The terminals are exposed at the bottom surface of the chip carrier. In the surface mounting operation, the package is placed onto a circuit board so that each terminal on the package is aligned with the corresponding contact pad on the circuit board. Solder or other bonding material is provided between the terminals and the contact pads. The package can be permanently bonded in place by heating the assembly so as to melt or "reflow" the solder or otherwise activate the bonding material. Numerous packages of this general type have been proposed for various applications. Most commonly, such packages include a dielectric element, commonly referred to as a "chip carrier" with terminals formed as plated or etched metallic structures on the dielectric. These terminals typically are connected to the contacts of the chip itself by features such as thin traces extending along the chip carrier itself and by fine leads or wires extending between the contacts of the chip and the terminals or traces. These packages also may include an overmolding or encapsulant covering the chip and also covering the upper of the chip carrier.

Chips used for generating or processing radio frequency ("RF") signals, commonly referred to as "RF chips" are used in wireless devices such as cellular telephones and wireless data communication devices. There have been increasing needs for packages especially suited for use with RF chips with increasing adoption of wireless devices. RF chips typically generate substantial amounts of heat during operation. Moreover, RF chips require low impedance connections to external circuitry and in some cases require connections capable of handling appreciable electrical current. Moreover, packages for RF chips desirably incorporate electrical shielding which prevents unwanted propagation of electrical magnetic fields between the RF chip and the surroundings. For example, a radio frequency power amplifier chip used in a transmitter can generate significant spurious RF emissions. Other elements of the circuit must be protected from these emissions. Conversely, a radio frequency amplifier used in a receiver should be isolated from RF emissions generated by other components.

It is desirable to package RF chips in a unit containing other components such as, for example, inductors, couplers, chokes, capacitors and resistors separate from the RF chip itself. The entire package should be as small as possible to facilitate miniaturization of the overall wireless device. Also, such packages should be manufacturable at low cost and with high reliability. All of these factors, taken together, have presented a considerable challenge heretofore.

SUMMARY OF THE INVENTION

One aspect of the invention provides a microelectronic package including at least one lower chip, most preferably a radio frequency chip and a connecting element extending above the lower chip. The package desirably also includes at least one upper chip disposed above the connecting element. The connecting element extends horizontally outwardly, beyond the lower chip or chips. Most preferably, the connecting element includes one or more dielectric layers and one or more layers of traces extending along the dielectric layer or layers. For example, the connecting element may be a single layer or multi-layer rigid circuit board or a flexible circuit panel, commonly referred to as a "tape."

The package most preferably also includes an assembly of components referred to herein as a bottom plane element including a plurality of terminals and a thermal conductor. Preferably, the thermal conductor is an element having an area substantially larger than the area of each of the terminals. The thermal conductor most desirably is at least partially aligned with the at least one lower chip, so that the lower chip or chips overlie the thermal conductor and are in heat transfer relation therewith. The terminals most preferably are -substantially co-planar with the thermal conductor, such that all of these components lie at a vertical level lower than lower chip or chips. The terminals and thermal connector are exposed at the bottom surface of the package so that these elements can be bonded to corresponding elements of a circuit board or other external substrate when the package is mounted.

In a particularly preferred arrangement, the lower chip or chips are active semiconductor chips, most preferably RF chips such as RF power amplifier chips, whereas the upper chip or chips include one or more integrated passive chips. Such an integrated passive chip incorporates numerous passive components such as resistors, capacitors and inductors. In preferred structures according to this aspect of the invention, the terminals are disposed adjacent the periphery of the package, outside the area occupied by the lower semi-conductor chip or chips. Leads extend from these terminals upwardly to the connecting element. Thus, the connecting element carries signals horizontally in a plane above the lower chips and the leads carry the signals down to the terminals. Stated another way, the chip carrier handles the horizontal translation or "fan out" of signal traces from the contacts of the lower chips to the periphery of the connecting element. The upper chip or chips can be of any size. Typically, all of the passive components to be incorporated in an integrated passive chip can be provided in an integrated passive chip of relatively small size. In a particularly preferred arrangement, the thermal conductor, terminals and leads are fabricated as elements of a unitary lead frame. Thus, the leads can be robust, thick structures which provide low impedance connections between the terminals and the connecting element. Moreover, the routing on the connecting element can be relatively uncomplicated and can provide room for relatively large, broad traces. As further discussed below, the upper chip or chips can be mounted directly above the lower chip or chips and hence communication between the upper and lower chips can be handled by very short lines as, for example, by direct vertical connections between aligned contacts of the upper and lower chips. The preferred connecting elements are substantially less expensive per unit area than the chips themselves. Therefore, use of a connecting element other than the chips themselves to provide horizontal translation of the signals substantially reduces the cost of the package.

A package according to a further embodiment of the invention includes a connecting element incorporating a dielectric element and traces extending along the dielectric element, the connecting element having top and bottom surfaces. The package includes at least one lower chip mounted to the bottom surface of the connecting element, at least one lower chip having a surface remote from the connector defining a lower datum at a level below the connector. The package according to this aspect of the invention includes a plurality of active terminals disposed at or below the lower datum and also includes a plurality of active leads in the form of elongated strips extending between the active terminals and the connecting element. The active leads are connected to at least some of the traces. Most desirably, at least some of the active leads are thicker than the traces on the connecting element. Such a structure can be fabricated by providing the active leads as elements of a lead frame. A package according to this aspect of the invention may also include one or more upper chips mounted to the top surface of the connecting element and desirably also includes an encapsulant surrounding the active leads and be at least one or lower chip.

Yet another aspect of the invention provides a unitary metallic lead frame incorporating a plate having top and bottom surfaces and having edges. The lead frame according to this aspect of the invention also includes one or more temporary elements and a plurality of active terminals spaced horizontally from the plate as, for example, in rows alongside one or more edges of the plate. Most preferably, the active terminals are connected to the plate only through the temporary elements. The lead frame also desirably includes a plurality of active leads projecting upwardly from the active terminals and projecting above the top surface of the plate. Most preferably, these active leads also extend inwardly toward the plate. Desirably, the temporary elements extend outwardly relative to the plate beyond the active terminals. For example, where the active terminals are disposed in rows extending alongside edges of the plate, the temporary elements may include strips extending beside the rows of active terminals so that each row of active terminals is disposed between one such strip and the plate. As explained below, these structures facilitate disconnection of the active terminals and active leads from the plate after assembly of the other components. Lead frames according to this aspect of the invention can be used in fabrication of packages as discussed above.

A further aspect of the invention provides methods of making microelectronic packages. Methods according to this aspect of the invention desirably include the steps of assembling a subassembly incorporating a connecting element having top and bottom surfaces, one or more lower chips mounted to the bottom surface with a bottom plane assembly including a thermal conductor and active terminals substantially coplanar with the thermal conductor. The assembly step desirably is performed so that the lower chips lie between the connecting element and the thermal conductor and hence the connecting element is disposed above the thermal conductor and above the one or more lower chips. The method further includes the step of electrically connecting the connecting element to the active terminals. Most preferably, the bottom plane assembly includes active leads projecting upwardly from the active terminals so that the connecting element is juxtaposed with the active leads in the assembling step. Stated another way, the bottom plane assembly desirably includes a structure, such as the aforementioned lead frame having active leads projecting upwardly from the plane of the thermal conductor and the assembling step is performed so as to drop the lower chips between the active leads, into proximity with the thermal conductor. The subassembly used in this process may also include one or more upper chips mounted to the top surface.

According to an aspect of the invention, a packaged chip is provided which includes a bottom package element and a top package element. Each of the package elements have an upwardly facing top surface and a downwardly facing bottom surface. Each package element further includes one or more dielectric layers and a plurality of conductive elements.

The top package element overlies the bottom package element so as to define an interior space between the top and bottom package elements. The conductive elements of the bottom package element include bottom terminals exposed at the bottom surface of the bottom package element. The conductive elements of the top package element include top terminals exposed at the top surface of the top package element.

One or more chips are disposed in the interior space and connected to at least some of the terminals of at least one of the package elements. The conductive elements of the top package element substantially block radiative propagation of radio frequency energy between the one or more chips and a space above the top package element.

According to a preferred aspect of the invention, at least some of the terminals of the top and bottom package elements are electrically connected to one another. Desirably, at least one chip is adapted to process radio frequency analog signals and may be a radio frequency power amplifier, for example.

According to a particular preferred aspect of the invention, a first chip and a second chip are included in the packaged chip, each chip having a front face with contacts thereon, a rear face and edges extending between the front and rear faces, the first and second chips being stacked in face-to-face arrangement with the rear face of the second chip facing toward one of the package elements.

According to a preferred arrangement, the faces of the second chip are larger than the faces of the first chip, and the second chip extends beyond the first chip in at least one horizontal direction.

According to another aspect of the invention, a packaged chip is provided which includes at least one chip having at least one edge, a bottom package element and a top package element. Each of the package elements have an upwardly facing top surface and a downwardly facing bottom surface. The top package element overlies the chip and the bottom package element so that the package elements define an interior space between them in which the chip is disposed.

According to such aspect of the invention, the conductive elements of the bottom package element include bottom terminals exposed at the bottom surface of the bottom package element. The conductive elements of the top package element include top terminals exposed at the top surface of the top package element.

The chip is connected to at least some of the terminals of at least one of the package elements. Leads extend from one or both of the package elements into or through the interior space. According to such aspect of the invention, at least some of the conductive elements of the top and bottom package elements are interconnected with one another through the leads.

In a preferred arrangement according to this aspect of the invention, the conductive elements on at least one of the package elements include traces and at least some of the leads are formed integrally with the traces. Alternatively, or in addition thereto, at least some of the leads include wire bonds. In an embodiment, the leads include bottom leads extending between the chip and the bottom package element and top leads extending between the chip and the top package element. Desirably, the leads further include interconnect leads directly connecting at least some of the conductive elements of one of the package elements to at least some of the conductive elements of another one of the package elements.

According to a preferred aspect of the invention, the packaged chip further includes interconnect pillars extending between the top and bottom package elements, interconnecting at least some of the conductive elements on the package elements with one another.

According to another aspect, the packaged chip further includes ball interconnect structures extending between the top and bottom package elements, interconnecting at least some of the conductive elements on the package elements with one another.

Desirably, according to a particular preferred aspect, one or more chips are disposed above the top package element and connected to at least some of the terminals of the top package element such that the conductive elements of the top package element substantially block radiative propagation of radio frequency energy between the one or more chips disposed in the interior space and the one or more chips disposed above the top package element.

According to a preferred aspect of the invention, a cap panel is provided, overlying the top package element and defining a top space between the cap panel and the top package element. The cap panel includes conductive elements defining at least a part of an antenna. Desirably, the conductive elements of the cap panel define a shield disposed between the antenna and the top space.

According to another preferred aspect of the invention, the top and bottom package elements and the cap panel include integral portions of a unitary sheet having at least two folds therein.

According to another aspect of the invention, an electronic assembly is provided which includes a first chip including a radio frequency power amplifier (RFPA), and at least one other chip disposed in vertically stacked relation to the first chip. A package is used to hold the chips. The package includes bottom terminals adapted for mounting to a circuit panel, interconnection between the chips and shielding adapted to substantially block radiative propagation of radio frequency energy between the first chip and at least one other chip of the assembly. Shielding is desirably provided between the first chip and a space external to the assembly. The package desirably includes at least a portion of an antenna. The shielding is desirably adapted to shield the at least one other chip from RF energy radiated from the first chip.

According to particular preferred aspects, the electronic assembly forms part of a portable electronic communication device, a handset, and a cellular mobile communication device including a handset.

According to yet another aspect of the invention, an electronic assembly is provided which includes a first chip having a radio frequency power amplifier (RFPA) adapted to produce at least 10 milliwatts RF power. A second chip including a surface acoustic wave chip is also provided in the assembly. The first and second chips are held by a package which includes bottom terminals adapted for mounting to a circuit panel and shielding between the first chip and the second chip. The shielding is desirably adapted to shield the second chip from RF energy radiated from the first chip.

Desirably, the package occupies a volume of less than about 0.5 cm$^3$.

According to yet another preferred aspect of the invention, a packaged chip is provided which includes at least one lower chip. A top package element is provided extending above the lower chip and extending in horizontal directions beyond the lower chip. At least one lower chip is mounted to the top package element. A plurality of leads extend downwardly from the top package element. In such arrangement, the top package element and the leads substantially block radiative propagation of radio frequency energy between the lower chip and a space above the top package element.

Further preferred variants of this aspect include an enclosure extending around edges of the lower chip such that the leads substantially block radiative propagation of radio frequency energy between the lower chip and a space external to the enclosure. According to a preferred aspect of the invention, the leads are such as selected from the group consisting of pre-formed solder features, pillars, wire bonds, and leads formed integrally to a the chip carrier.

In a particularly preferred aspect, at least one lower chip includes a functional element such as selected from the group consisting of radio frequency (RF) transmitter, RF power amplifier, RF energy switch, and filter. The filter can be a surface acoustic wave type filter, for example.

According to yet another particularly preferred aspect of the invention, one or more upper chips are disposed above the package element. The one or more upper chips include one or more functional elements such as selected from the group consisting of RF receiver, low noise amplifier, RF mixer, IF mixer, sampler, oscillator, and signal processor.

These and other objects, features and advantages of the present invention will be more readily apparent from the detailed description set forth below, taken in conjunction with the accompanying drawings.

BRIEF DESCRIPTION OF THE DRAWINGS

FIG. 1 is a top plan view of a lead frame in accordance with one embodiment of the invention.

FIG. 2 is a sectional view taken along line 2—2 in FIG. 1.

FIG. 3 is a fragmentary sectional view taken along line 3—3 in FIG. 1.

FIG. 4 is a view similar to FIG. 2 but depicting the lead frame in conjunction with a subassembly during the step of a manufacturing process.

FIG. 5 is a fragmentary sectional view of the subassembly depicted in FIG. 4.

FIGS. 19–24 are diagrammatic sectional views of packaged chips according to still further embodiments of the invention.

DETAILED DESCRIPTION

Figure 6:
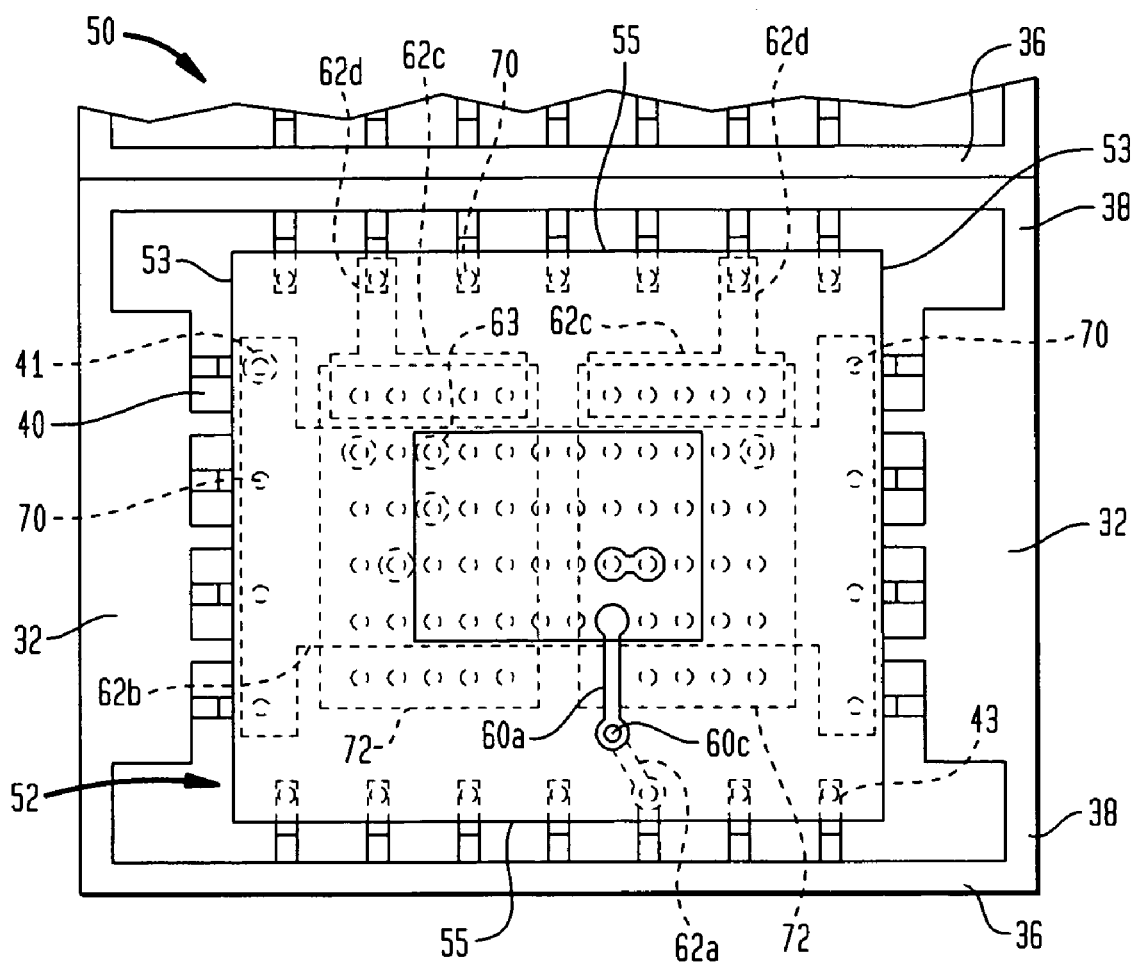
FIG. 6 is a top plan view of the assembly formed from the subassembly and lead frame of FIG. 3.

A lead frame 20 in accordance with one embodiment of the invention (FIG. 1) is formed as a unitary structure from a metal such as copper as, for example, copper on the order of 50–500 microns thick. The lead frame in accordance with this embodiment includes a central thermal conductor or plate 22 which is generally rectangular and has a pair of opposed edges 24 referred to herein as the active edges of the plate and a pair of additional opposed edges 26 referred to herein as the ground edges. The plate also has a top surface 28 and a bottom surface 30. The lead frame includes a pair of smaller rectangular plates referred to herein as ground buses 32 extending parallel to the ground edges 26 of the central plate. One or the other or both of the ground buses 32 can be used as ground connections in a completed assembly or as a power bus for supplying power. Hereinafter, the term ground bus shall refer to the structure, in which ever way it is used. The ground buses are connected to central plate 22 by a set of ground struts 34 projecting outwardly from central plate 22. A temporary element or rail 36 extends alongside each active edge 24. Each temporary element is connected by an additional temporary element or rails 38 to the ground buses 32. The central plate 22, ground buses 32, struts 34 and temporary elements 36 and 38 all lie in a common plane.

As used in this disclosure with reference to such a lead frame or other generally planar structure, the term "horizontal" is used to refer to directions in the plane of the structure, i.e., the directions along the drawing sheet in FIG. 1 and the directions to the left and right in FIG. 2. The term "vertical" and the corresponding terms "upwardly" and "downwardly" are used to refer to directions transverse to this plane. Also, the term "horizontally outwardly" is used as referring to directions away from the central plate 22 whereas the term "inwardly" is used as referring to horizontal directions towards the center of the plate.

A set of ground leads 40 project upwardly from each ground bus 32. The ground leads associated with each ground bus also project horizontally inwardly from the ground bus toward plate 22. As best seen in FIG. 1, the ground leads 40 associated with each ground bus 32 are interspersed with the ground struts 34 which connect the ground bus to central plate 22. As best seen in FIG. 2, each ground lead 40 defines an upper land 41 at its inner end.

A row of active leads 42 is provided alongside each active edge 24 of central plate 22. The active leads of each row are integral with the temporary element 36 extending alongside the active edge adjacent such row. Each active lead projects inwardly from the temporary element and also projects upwardly above the plane above the temporary elements. As best seen in FIG. 3, each active lead defines an upper land 43 at its inner end, above the plane of plate 22 and defines a lower land 45 or active terminal at its outer end, remote from the plate and adjacent to the temporary element 36. The upper land 43 of the active leads desirably are coplanar with the upper land 41 of the ground leads, whereas the lower lands 45 desirably are coplanar with the bottom surface 30 of plate 22.

Lead frame 20 desirably is provided in the form of a continuous or semi-continuous tape, strip or sheet incorporating numerous lead frames as described above. For example, in FIG. 1 the lead frame 20 discussed above is shown in conjunction with a portion of an adjacent lead frame 20a. The lead frames join one another along the temporary elements 36 and along the outer edges of the ground buses 34 and adjacent temporary elements 38.

A subassembly 50 (FIGS. 4–6) incorporates a connecting element 52 in the form of a circuit panel having a dielectric layer 54 defining a top surface 56 and a bottom surface 58. The circuit panel is generally rectangular, and defines edges 53, referred to herein as ground edges, and edges 55, referred to herein as active edges. Dielectric element 54 has conductive elements or traces 60 on a top surface 56 and also has conductive elements or traces 62 on bottom surface 58 (FIG. 5). The conductive features on the connecting element typically are formed from layers of metal on the order of 5–50 µm thick, as conventionally employed in flexible circuits. These features can be formed by known etching or plating processes used in fabrication of flexible circuits or circuit boards. The circuit panel defines mounting pads 64 on its top surface and further mounting pads 65 on its bottom surface. As also seen in FIG. 5, the circuit panel includes conductive through vias 66 extending between the top and bottom surfaces of the circuit panel. Some of the vias 65 directly interconnect pads 64 on the top surface with corresponding pads 66 on the bottom surface. Other vias, such as via 65 (FIG. 6) interconnects a top surface trace 60a with a bottom surface trace 62a. Subassemblies 50 desirably are provided in the form of a continuous strip or tape (not shown) incorporating numerous connecting elements formed on the same dielectric layer or layers. The features of these connecting elements are provided at a repeat distance equal to the repeat distance between adjacent lead frames in the strip or tape of lead frames discussed above.

The circuit panel can have any type of commonly used dielectric layers. For example, the circuit panel can include a dielectric layer 54 of an FR-4 or FR-5 epoxy reinforced fiberglass board, BT resin and/or polyimide. BT resin and/or polyimide can be used in either reinforced or unreinforced circuit panels. Alternatively, the circuit panel can be formed having as a tape having a flexible dielectric layer.

Connecting element 52 may be provided with a set of relatively large pads or lands 70 on bottom surface 58 at the periphery of the connecting element, adjacent edges 53 and 55. The traces and other metallic features interconnect these lands with some or all of the pads 64 and 66 discussed above. The conductive features on the bottom surface 58 include a large, generally rectangular ground plane 62b extending between ground edges 53 and incorporating several lands 70 at the ground edges. The ground plane 62b may have openings 63 (FIGS. 5 and 6) to provide electrical isolation from some of the pads 66 on the bottom surface. The conductive features or traces on the bottom surface also include a pair of large RF pads 62c (FIG. 6) and wide RF traces 62d connected to these pads and extending to lands 70 adjacent an active edge 55. Only a few of the traces 60, on the top surface are shown. These traces may be provided as needed to interconnect pads and vias as required for circuit routing.

The subassembly further includes a pair of lower chips 72. Each lower chip has a front surface 74 with contacts 76 exposed at such front surface. Each lower chip also has a rear surface 78 and edges 80 extending between the front and rear surfaces. The lower chips are mounted on the bottom surface 58 of the connecting element and connected to the pads 66 on the bottom surface by solder balls 82 or other conductive bonding material. In one example, fluxless soldering process may be used for joining the chips to the connecting element. Such fluxless process can be carried out, for example, in an atmosphere of nitrogen or other inert atmosphere, or under vacuum. In another example, stud bumps or balls having gold at their surfaces, or formed entirely of gold, can be diffusion-bonded to corresponding lands 66 or other features of connecting element 52 having contacting surface of tin. Desirably, gold stud bumps are formed on the chips by a wire bonder, when such chips are still in pre-diced wafer form. Such process permits the gold stud bumps to be applied at a desirably high rate and the pitch and height of bumps to be well controlled. The reverse variant, with the gold stud bumps provided on the lands and with the compatible bonding surfaces on the chips, may also be used.

Lower chips 72 are mounted side-by-side adjacent the center of the connecting element and, hence, remote from edges 53 and 55. Stated another way, the connecting element extends horizontally outwardly, beyond the lower chips, so that the lands 70 project outwardly beyond the lower chips. The subassembly further includes an upper chip 84 having a front surface 86 with contacts 88 thereon and also having a rear or upwardly-facing surface 90 and edges 92 extending between the front and rear surfaces. The upper chip is mounted on the upper surface 56 of the connecting element in substantially the same way as the lower chip, so that the contacts 88 of the upper chip are bonded to the pads 64 on the upper surface of the connecting element, as by solder balls or other conductive bonding material 94. The chips may be assembled to the connecting element by conventional bonding techniques such as those commonly employed in flip-chip bonding. With the chips mounted in this manner, the chips are interconnected with one another, and with the lands 70 of the connecting element. Because upper chip 84 is mounted over the lower chips 72, some or all the contacts of the upper and lower chips can be aligned with one another. Some or all of the interconnections between the upper and lower chips can be short, straight-through connections, each such straight-through connection being defined by a single conductive via 65 extending between a contact 82 of the lower chip and a contact 88 of the upper chip aligned therewith.

In this embodiment, lower chips 72 are active, radio frequency chips such as radio frequency power amplifier chips, whereas upper chip 84 is an integrated passive chip having passive components such as resistors and capacitors, but having no active components. In the condition illustrated, the subassembly can be tested for proper function as, for example, by engaging lands 70 with contacts on a test fixture. Also, additional contact points or test lands (not shown) can be provided on connecting element 52. Further, the connecting element may itself include passive components such as resistors, capacitors and, particularly, inductors. As described in certain embodiments of the aforementioned international application PCT/US02/27509, inductors can be formed by traces and other electrically conductive elements of a circuit panel and also can be formed by interconnections between elements as, for example, by interconnections between traces of the circuit panel and conductive elements on one of the chips. For example, inductors may be defined by conductive elements on the panel or connecting element 52 in conjunction with conductive elements on the upper or passive chip 84.

In an assembly method according to an embodiment of the invention, subassembly 50 is assembled to the lead frame 20 described above. As best seen in FIGS. 4 and 6, the subassembly 50 is aligned over the lead frame so that the lands 70 adjacent ground edges 53 of the connecting element overlie the upper lands 41 of the ground leads, whereas the lands 70 adjacent the active edges 55 overlie the upper lands 43 of the active leads. The subassembly is advanced downwardly relative to the lead frame, by moving the subassembly downwardly or moving the lead frame upwardly, so as to engage the lands of the connecting element with the upper lands of the lead frame. Prior to engaging the lands with one another, solder balls or other conductive bonding materials 96 are provided on the lands 70 of the connecting element or on the lands of the lead frame. For example, the solder balls 96 may be applied in the same process used to apply the solder balls for mounting the lower chips 72. Alternatively, the lead frame can be "tinned" or provided with a thin coating of a solder or other bonding material on the upper lands 41 and 43 prior to assembling the lead frame with the subassembly. A diffusion bonding material set such as a layer of tin on the lands 70 of the connecting element and a layer of gold on the lands 41 and 43 of the lead frame, or vice-versa, also may be used. The lands 70 of the connecting element are bonded to the lands of the lead frame, thereby electrically connecting the conductive elements of the connecting element with the active leads and ground leads of the lead frame. The rear surfaces 78 of the lower chips may be brought into direct abutment with the central plate or thermal conductor 22 of the lead frame. Alternatively, a layer of a die attach, which desirably is relatively thin and thermally conductive, may be provided between the rear surfaces of the lower chips and the central plate. The die attach may be a metallic die attach such as a solder may be used. Alternatively, an intermetallic bond may be used. For example, the thermal conductor 22 of the lead frame may be formed from copper and may be provided with a thin coating of tin, solder or other metallic bonding material for presenting a cooperating bonding surface for metallized surfaces of lower chips 72. The rear surfaces of the lower chips 72 are desirably metallized by a coating of gold such that a tin-gold or solder-gold contact is formed when lower chips 72 are joined to the tinned surface of thermal conductor 22. The reverse arrangement can also be used, with the rear surfaces of the lower chips metallized by a coating of tin and the thermal conductor coated, e.g. plated, with gold. Desirably, this process is performed while the lead frame is still in the form of a continuous strip or tape with other adjacent lead frames, and while the connectors 50 are also in the form of a continuous strip or tape, so that multiple subassemblies are united with multiple lead frames or bottom plane elements in a single operation.

After the subassemblies have been joined with the lead frames, the resulting assemblies are encapsulated by overmolding with a protective resin as, for example, an epoxy, polyimide or other dielectric composition. This process may be performed in a conventional mold. Desirably, the bottom surface of the lead frame is protected during this process by a film or other temporary covering (not shown) or by one of the surfaces of the mold (not shown), so that the molding processes leaves these bottom surfaces free of the resin.

Figure 7:
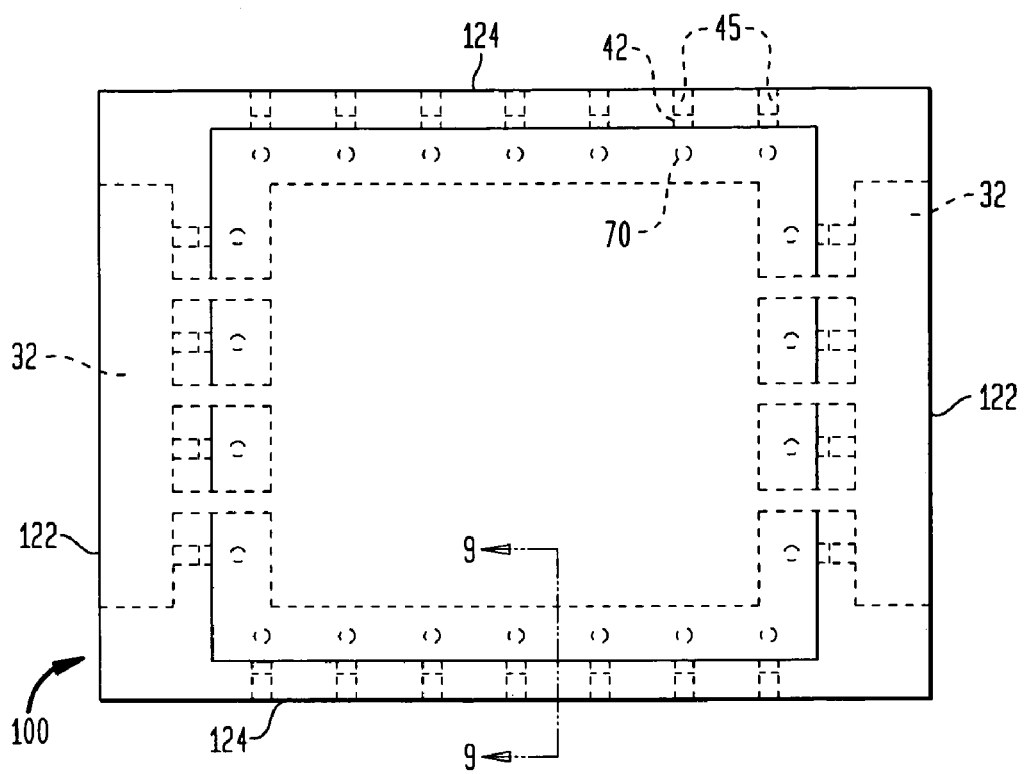
FIG. 7 is a top plan view depicting the assembly in a later stage of manufacture.
Figure 8:
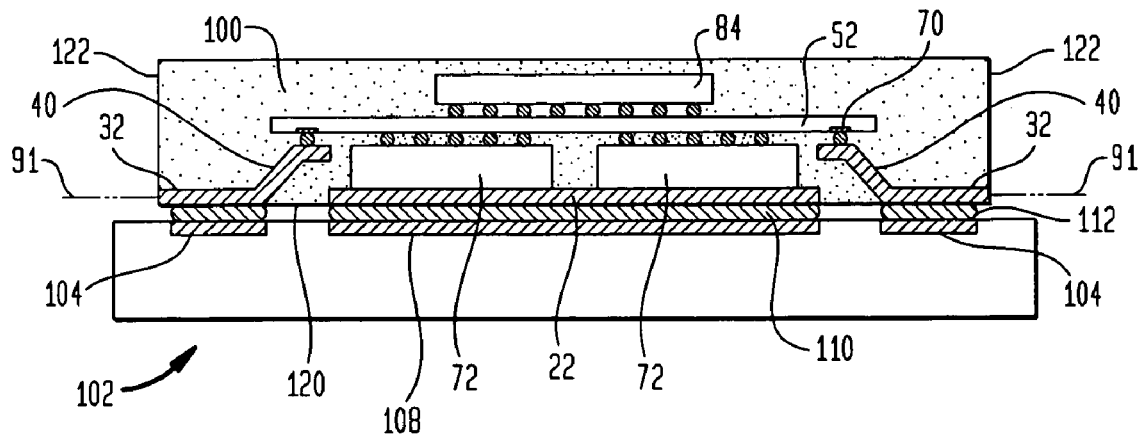
FIG. 8 is a sectional view depicting the assembly of FIG. 7 in conjunction with a circuit board.
Figure 9:
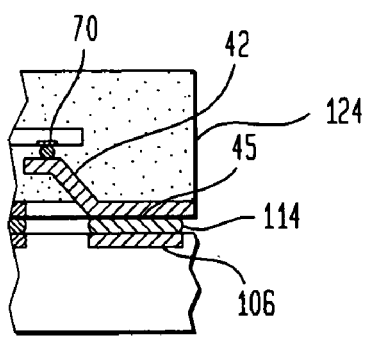
FIG. 9 is a fragmentary sectional view of the assembly and circuit board of FIG. 8, taken along line 9-8 in FIG. 7.

After encapsulation, the encapsulated assemblies formed on the various lead frames in the strip or tape are cut apart from one another or "singulated." During the singulation process, the temporary elements 36 and 38 and the outer margins of the ground buses 32 are cut away from the remainder of the lead frame. Because these temporary elements and outer margins lie at the outboard edges of the assembly, they can be removed during the singulation process without damaging the other components. Also, at the time these elements are removed, the other elements of the assembly are supported and held by the encapsulant. The resulting assembly (FIGS. 7–9) has the connecting element 52 and chips 84 and 72 embedded in a mass 100 of encapsulant. The mass has a bottom surface 120 near the plane of the thermal conductor, ground edge surfaces 122 projecting upwardly from the bottom surface adjacent ground busses 32 and active edge surfaces 124 projecting upwardly from the bottom surface at the rows of active terminals 45. In this condition, each active lead 42 and active terminal 45 is electrically isolated from the other active leads and active terminals, but is maintained in position by the encapsulant mass 100. The upper portions of the ground leads 40 and active leads 42 (FIG. 9) are also embedded in the encapsulant, so that these leads are fixed in position relative to the connecting element 52. However, the ground buses 32 and the lower lands 45 defined by the active leads remain exposed at the bottom surface 120 of the mass. Similarly, the bottom surface of the central plate or thermal conductor 22 also remains exposed at the bottom surface of the mass. The thermal conductor, ground buses and terminals lie below a lower datum plane 91 defined by the rear surfaces of lower chips 72. Depending upon the exact conditions used for molding, these surfaces may be recessed relative to the surrounding bottom surface of the encapsulant mass, or may project slightly below the surrounding encapsulant, or else may be flush with the bottom surface of the encapsulant as seen in FIGS. 8 and 9. However, the surfaces of the ground buses, central plate and lower lands of the active leads remain accessible so that they can be contacted by bonding material applied to the bottom of the package, i.e., to the surface facing downwardly in FIGS. 8 and 9. As best seen in FIGS. 7 and 9, the lower lands or active terminals 45 are disposed adjacent the edges 124 of the encapsulant mass 100 and, hence, adjacent the edges of the package. The ground buses 32 are also disposed adjacent other edges 122 of the encapsulant mass 100.

The resulting package can be surface-mounted to a circuit board 102 or other circuit panel. Desirably, the circuit board has ground contacts 104, active contact pads 106 (FIG. 9) and a large thermal contact pad (108) (FIG. 8) arranged in a pattern corresponding to the pattern of the ground buses 32, lower lands or active terminals 45, and the central plate 22. The package can be bonded to the circuit board by solder-bonding. Desirably, a layer of solder 110 or other bonding material is provided between the central plate or thermal conductor 22 and the thermal pad 108, whereas smaller masses of bonding material 112 provided between the ground contact pads 104 and the ground buses 32. Other masses of bonding material 114 are provided between the other contact pads 106 and the active terminals 45. Here again, the bonding material may be provided as a pretinning or coating on the lead frame. The circuit board has appropriate signal connections to each of the contact pads 106 associated with the active terminals 45. Thus, the active terminals 45 serve as active signal contacts for the packaged assembly. The ground buses 32 and central plate 22 serve as ground contacts. Moreover, the bonded plate 22 serves as a thermal conductor for conducting heat from the lower chips 72 and other elements of the package into the circuit board. The plate or thermal conductor 22 has a large surface area and high thermal conductivity. The large mass 110 of bonding material provides a similar low resistance thermal path from the plate to the thermal pad 108 on the circuit board. Active leads 42 and ground leads 40 provide robust connections between the conductive elements of connecting element 52 and the circuit board. The central plate or thermal conductor 22 provides electromagnetic shielding below the lower chips 72. Moreover, the large ground plane 62B (FIG. 6) and other metallic components on the connecting element 52 provide additional shielding over the top of the lower chips.

Figure 9A:
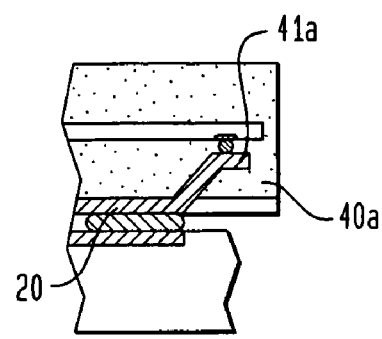

In a variation of the above embodiment, illustrated in FIG. 9A, some or all of the ground leads 40a are attached to the thermal conductor 22 and extend horizontally outwardly therefrom, to define upper leads 41a which are bonded to corresponding leads of the connecting element 52. In such case, one or more of the ground buses 32 of the lead frame 20 can be eliminated when ground leads 32 are connected to the thermal conductor and conductive interconnection to ground is further provided through the thermal conductor.

Figure 10:
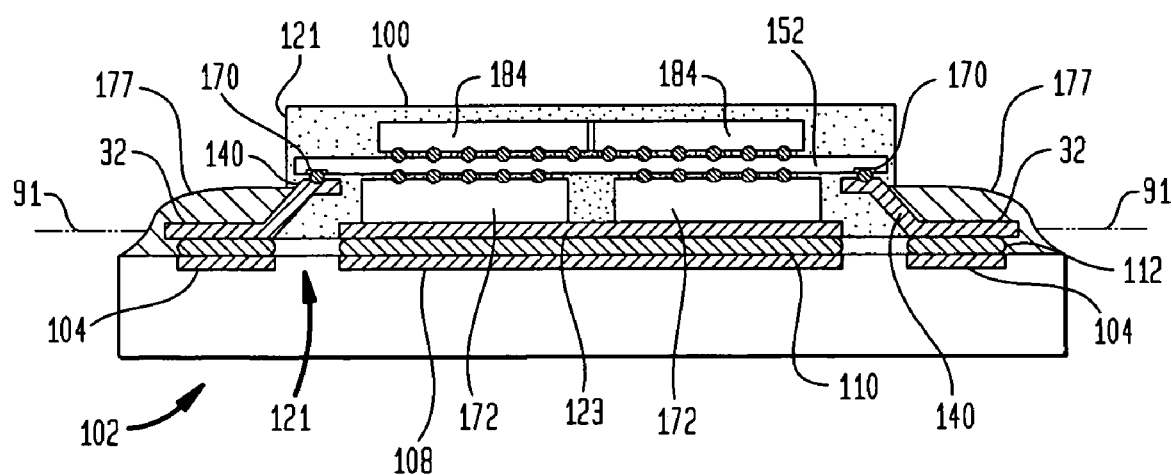
FIG. 10 is a sectional view illustrating a package in accordance with a further embodiment of the invention.

The assembly of FIG. 10 is generally similar to the assembly described above relative to FIGS. 7–9. However, the assembly of FIG. 10 includes two lower chips 172 and two upper chips 184. The lower or active chips 172 include a radio frequency chip, such as a high performance chip fabricated in a gallium arsenide technology, and a complementary metal oxide semiconductor (CMOS) chip such as a power controller chip. Upper chips 184 desirably include integrated passive devices. One upper chip 184 is associated with each of the lower chips 172. The contacts of the associated chips may be aligned with one another so as to provide straight-through connections between upper and lower chips similar to those described above with reference to FIGS. 4–6. The connecting element 152 may include a multilayer laminate substrate (MLC), including several metal layers as, for example, four metal layers. Upper chips 184 and lower chips 172 are flip-chip mounted to the connecting element 152 in the same manner as described above.

The assembly of the connecting element 152 and chips 172, 184 is mounted to the lead frame in the same manner as discussed above, by bonding leads 140 to pads 170 and by abutting the rear surfaces of the lower chips with the thermal conductor 123 of the lead frame or bonding the rear surfaces of the lower chips to the thermal conductor.

Encapsulation and singulation of the joined assembly is desirably performed in generally the same manner as described above with respect to FIGS. 7–9. However, in this embodiment, the encapsulant 100 is applied so that the edge surfaces 121 lie inwardly of ground busses 32, i.e., so that the ground busses 32 which form the terminals for the ground leads 140 project outwardly beyond the adjacent edge surfaces of the encapsulant mass. The ground leads 140 connected to the ground busses project upwardly outside of the encapsulant, and extend inwardly, into the encapsulant above the bottom plane of the assembly. The active leads (not shown) have a similar configuration; the terminals associated with these leads also project outwardly beyond the edges of the encapsulant mass. When the assembly is mounted to a circuit panel, solder fillets 177 may be formed on the top surfaces of the terminals, i.e., on the top surfaces of ground busses 32 and on the top surfaces of the terminals associated with the active leads. The solder fillets may be integral with the solder which connects the terminals to the circuit panel. The solder fillets provide further enhanced heat dissipation from the package, including enhanced thermal conduction to the circuit panel.

Figure 11:
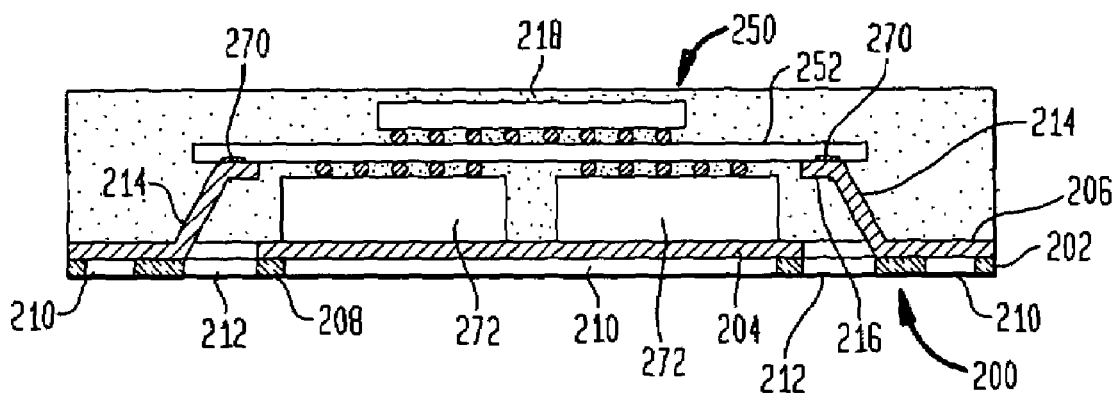
FIG. 11 is a sectional view depicting a package in accordance with a further embodiment of the invention.

In the embodiment of FIG. 11, the bottom plane element of the package is defined by a chip carrier rather than a lead frame. The chip carrier 200 includes a bottom plane dielectric layer 202 with a central thermal conductor 204 and terminals 206 thereon. The terminals and thermal conductor in this embodiment are exposed at the bottom surface 208 of the dielectric layer by holes 210 extending through the dielectric layer. The dielectric layer also has bond windows 212 extending through it. Leads 214 associated with the terminals 206 may be formed integrally with the terminals. Leads 214 may extend across the bond windows, in the plane of the terminals 206 and the thermal conductor 204. In this condition, prior to assembly, the inner ends 216 of the leads may be temporarily connected to the thermal conductor 204 as, for example, by frangible elements (not shown). A subassembly 250, similar to the subassembly 50, may be assembled with such a carrier, and the leads 214 may be bent upwardly and bonded to the lands 270 on the periphery of the connecting element 252. For example, a bonding tool may be advanced through the bond window to bend and bond the leads. The lead-bonding operation may be generally as disclosed in as disclosed, for example, in U.S. Pat. No. 5,915,752, the disclosure of which is hereby incorporated by reference herein. The resulting assembly may be encapsulated so as to form an encapsulant mass 218 overlying the upper surfaces of the terminals 206 and dielectric element 202 of the bottom plane element. The encapsulation process is conducted in a manner which leaves the terminals 206 and thermal conductor 204 exposed as, for example, by covering the bond windows 212 before introducing an encapsulant over the top surface of the dielectric element 206. In this embodiment as well, the conductive elements (not shown) on the connecting element 252 serve as connections between the chips and the lands 270 of the connecting element. Here again, the connecting element 252 extends horizontally outwardly beyond the lower chips 272.

Figure 12:
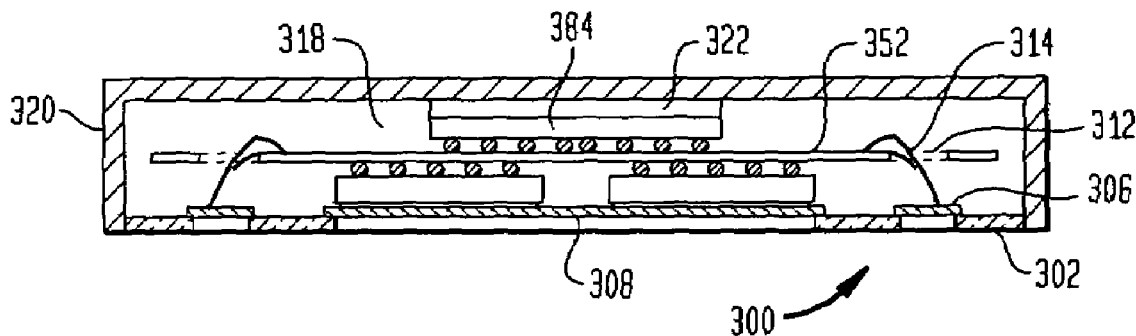
FIG. 12 is a view similar to FIG. 10 but depicting a package in accordance with yet another embodiment of the present invention.

A package according to yet another embodiment (FIG. 12) uses a bottom plane element 300, which also incorporates a dielectric layer 302, terminals 306 and thermal conductor 308, similar to the corresponding elements discussed above with reference to FIG. 11. In this arrangement, however, the leads 314 which connect the conductive features of the connecting element 352 to the terminals 306 are provided as strips formed integrally with the conductive elements of connecting element 352. Leads 314 may project outwardly from the edges of connecting element 352. Alternatively, the leads 314 initially may extend across bond windows 312 in the dielectric layer of the connecting element and may be displaced downwardly from the plane of the connecting element by a bonding tool, using a process similar to that discussed above. Other ways of providing leads extending upwardly and downwardly between the connecting element and the terminals may be employed. For example, wire bonds or other leads formed separately from the connecting element and separately from the bottom plane element may be used. As illustrated in FIG. 12, the encapsulant mass 318 and other components may be covered by a conductive electrical shield or can 320. In a further variant, a heat sink may be provided only on the upper surface of the encapsulant mass. The heat sink, shield or can 320 may be disposed directly on the rear surface of the upper chip 384 or may be connected thereto by a layer of a thermally-conductive grease or other flowable material 322. In a further variant, the bottom edge of can 320 may be solder-bonded to the circuit panel when the assembly is mounted to the panel, to provide a ground connection and to enhance thermal conduction to the panel. Such a can may be provided with a solder fillet similar to the fillet discussed above with reference to FIG. 10, with the solder fillet extending up along the sides of the can.

Any number of lower chips and any number of upper chips may be employed. Also, chips other than active RF chips and integrated passive chips may be used. For example, chips such as logic chips, memory chips and the like, can be provided in addition to the integrated passive chip or in place thereof. Further, the package may include discrete electrical components mounted to the connecting element or to the bottom plane element. In the embodiments discussed above, the chips are mounted with their front or contact-bearing surfaces facing toward the connecting element. However, one or more of the chips may have their front surfaces facing away from the connecting element, with the contacts of such chip being electrically connected to the connecting element by leads such as wire bonds.

Figure 13:
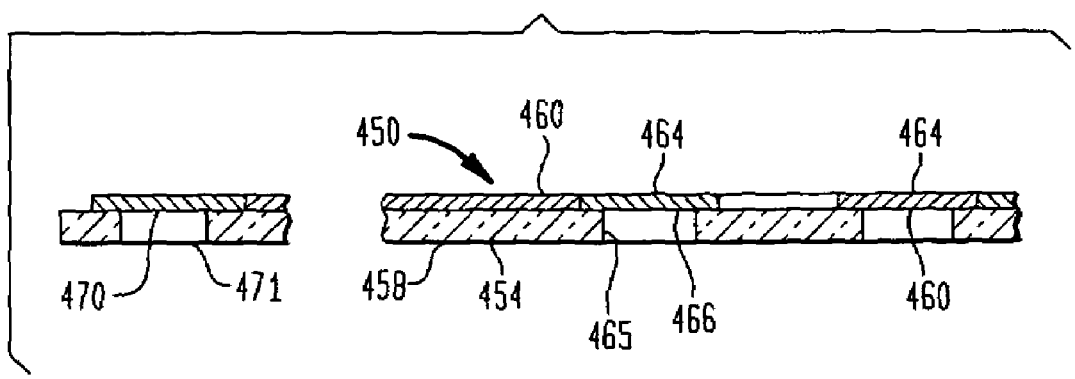
FIG. 13 is a fragmentary sectional view of a connecting element used in another embodiment of the invention.

The connecting element may include any number of layers of dielectric and any number of layers of conductive features. For example, the connecting element may be a multi-layer structure with internal conductive layers as well as layers on its upper and lower surfaces. Merely by way of example, internal conductive layers may include layers of traces or one or more ground planes, or other conductive planes. Alternatively, as seen in FIG. 13, a connecting element 450 may incorporate a single dielectric layer 454 and a single layer of conductive features on its top surface. The single layer defines pads 464 and traces 460 on the top surface. Some or all of the conductive features may be exposed through holes 465 in the dielectric layer to define further pads 466 exposed at the bottom surface 458 of the dielectric layer. Likewise, lands 470 adjacent the edges of the dielectric layer 454 may be exposed through holes 471 in the dielectric layer for connection to a bottom plane assembly as discussed above. A similar structure may have conductive elements disposed only on the bottom surface and may similarly define pads exposed on both surfaces.

Figure 14:
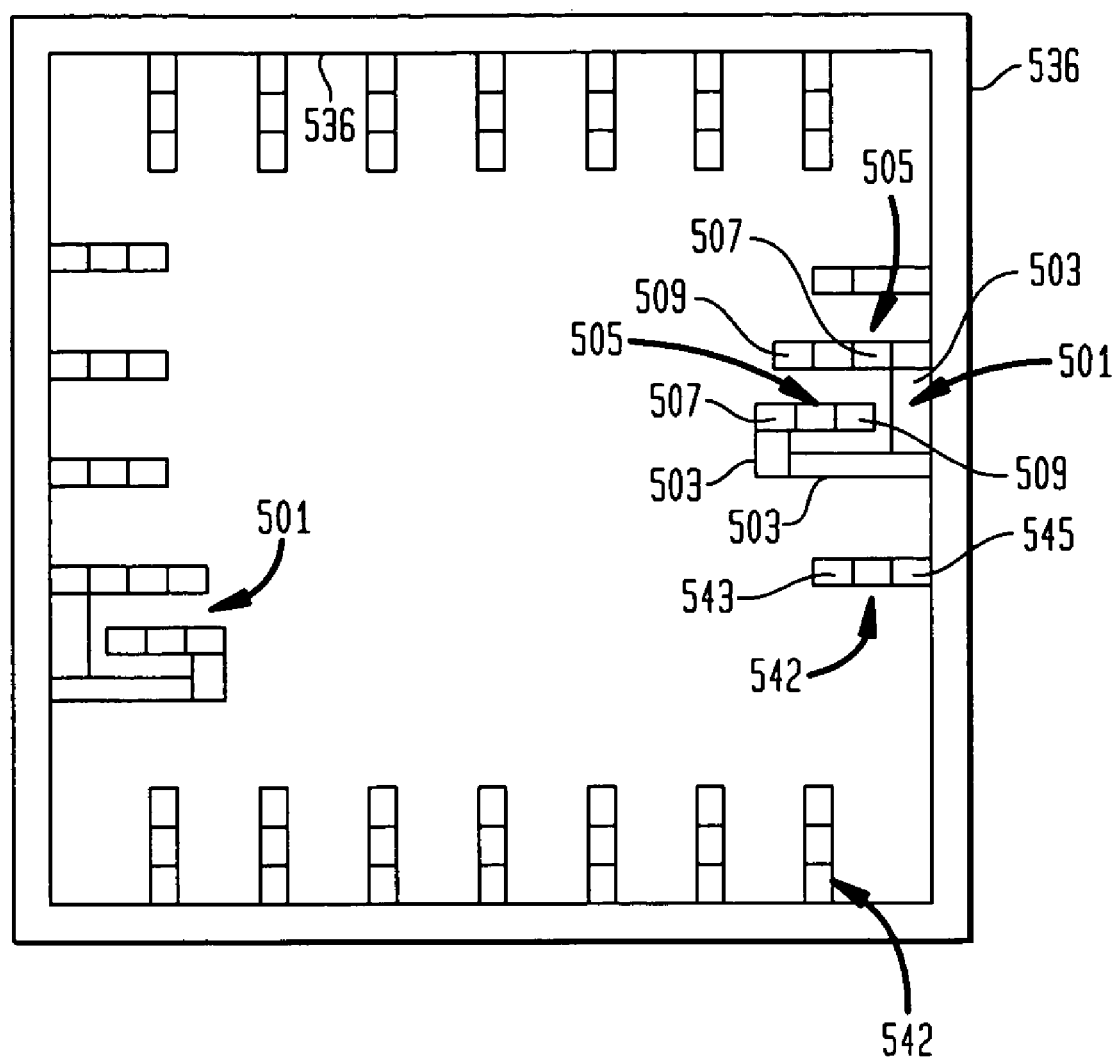
FIG. 14 is a view similar to FIG. 1 but depicting a lead frame in accordance with a further embodiment of the invention.

A lead frame in accordance with a further embodiment of the invention (FIG. 14) includes a plurality of terminal leads 542, each having a lower land or terminal 545 and an upper land 543 similar to the corresponding features of the active leads 42 discussed above with reference to FIG. 3. The lead frame of FIG. 14 further includes inductors 501. Each inductor includes a series of strips 503 cooperatively defining a turn or partial turn about an axis perpendicular to the plane of the drawing in FIG. 14. A pair of inductor leads 505 is provided for each inductor. Each inductor lead has a lower end 507 connected to one of the strips and an upper end 509 forming an upper land. The upper lands of the inductor leads are coplanar with the upper ends of the terminal leads. In the in-process condition of FIG. 14, the elements of the lead frame are physically connected to one another by temporary elements 536. A lead frame according to this embodiment can be assembled to a connecting element or subassembly (not shown) in the same manner as discussed above with reference to FIGS. 1–9. The connecting element has lands corresponding to the terminal leads and has additional lands corresponding to the inductor leads. Thus, assembly of the connecting element to the lead frame serves to connect the inductors in circuit with the traces on the connecting element. Here again, after assembly the temporary elements 536 are removed, leaving the terminals isolated from one another and from the inductors. Use of inductors formed integrally with a lead frame provides inductors formed from the relatively thick metal of the lead frame, and hence with very low internal resistance and correspondingly high Q values. The spiral inductors shown in FIG. 14 are merely illustrative; other types of inductors, such as those described in the aforementioned international application, can be made using conductive elements of the lead frame as parts of the inductors. Also, the inductor leads can connect to one or more of the chips, rather than to the connecting element or circuit panel.

In the embodiment of FIG. 14, the terminals and leads which will be used as ground connections to the circuit board are interspersed with the other terminals and leads. Stated another way, it is not essential to provide the ground features concentrated on a particular edge of the structure. Also, the embodiment of FIG. 14 omits the thermal conductor or central plate used in the embodiment of FIG. 1. The thermal conductor also may be omitted in the other embodiments as, for example, in the embodiments of FIGS. 11 and 12. Where the thermal conductor is omitted, the bottom surfaces of the lower chips optionally may be exposed at the bottom surface of the package so that the bottom surfaces of the lower chips can be bonded to elements of the circuit panel when the package is mounted on the circuit panel. Stated another way, the bottom surfaces of the lower chips may be coplanar with the terminals which serve to connect the package to the circuit panel. In such an arrangement, the bottom surfaces of the lower chips may be tinned or otherwise metallized to facilitate bonding during a surface-mounting operation or other operation used to mount the package to the panel.

Figure 15:
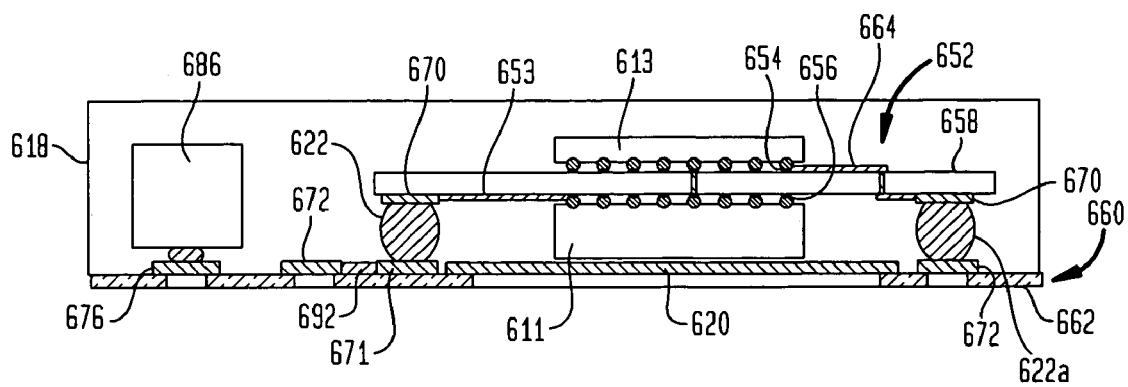
FIG. 15 is a diagrammatic section view of a packaged chip according to a further embodiment of the invention.
Figure 16:
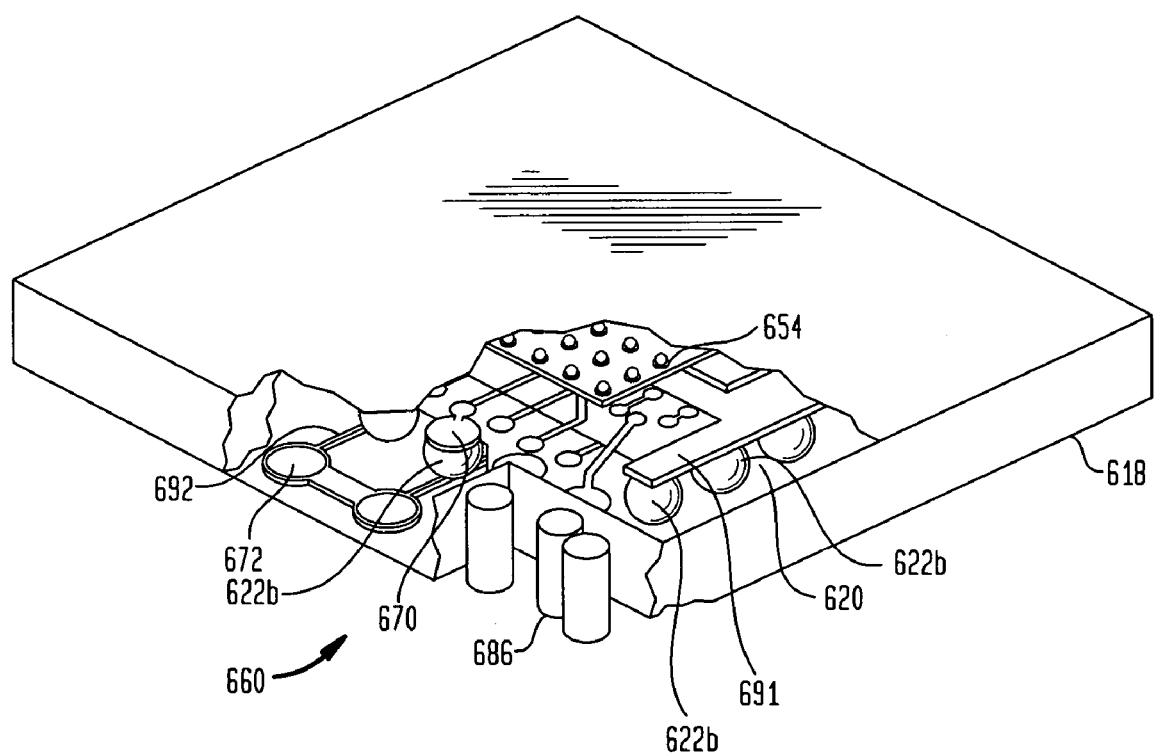
FIG. 16 is a cutaway perspective view of the packaged chip according to the embodiment of the invention shown in FIG. 15.

In the embodiment shown in FIGS. 15 and 16, the connecting element 652 is a chip carrier including a dielectric layer 658 and an upper patterned metallic layer defining lands 654 exposed at a top side of the chip carrier, and a lower patterned metallic layer defining lands 656 exposed at a bottom side and interconnect terminals 670, also exposed at the bottom side of the connecting element or chip carrier. The lower patterned metallic layer also defines a ground bus 691 (FIG. 16) which is also exposed at the bottom surface of the connecting element 652. One or both of the metallic layers further define traces 653 connecting interconnect terminals 672 with the lands and vias interconnecting some or all of the lands 656 with lands 654. Here again, the connecting element may include more than one layer of dielectric and may include more than two metallic layers. Alternatively, as discussed above with reference to FIG. 13, the connecting element may include only one metallic layer defining lands exposed at both sides of the chip carrier.

The bottom plane element 660 is provided as a lower chip carrier generally similar to the bottom plane element 200 discussed above with reference to FIG. 11. Thus, bottom plane element 660 includes a dielectric layer 662 and a patterned metallic layer 664 above the dielectric layer. This patterned metal layer defines active terminals 672, interconnect terminals 671 and traces 692 connecting the active terminals with the interconnect terminals, as well as additional component mounting terminals 676. The additional component mounting terminals are connected to some of the interconnect terminals 671 by additional traces (not shown). The active terminals 672 are exposed at the bottom surface of the bottom plane element through holes in dielectric layer 662. Some or all of the additional component mounting terminals 676 may also be exposed at the bottom surface through holes in the dielectric layer. The same patterned metal layer also defines a thermal conductor 620, which is also exposed at the bottom surface of the chip carrier through a large opening in the dielectric layer. As best seen in FIG. 16, the metallic layer may be in the form of a continuous metal layer defining the thermal conductor 620 and extending over substantially all of the upper surface of the dielectric layer except for those regions occupied by the terminals and traces. The continuous metal layer surrounds the terminals and traces, but is electrically isolated from these features by small gaps in the metallic layer. The continuous metallic layer provides an effective RF shield.

One or more lower chips 611, for example, active radio frequency chips are disposed below connecting element 652 and conductively attached as discussed above, to lands 656 on the bottom side of connecting element 652. One or more upper chips 613, for example, passive chips including one or more integrated passive components, are conductively attached to lands 654 of the upper patterned metal layer 664.

As best seen in FIG. 15, large solder balls 622 extend between interconnect terminals 671 and 672, thereby connecting active terminals 672 on the bottom plane element or lower chip carrier 660 and the additional component mounting terminals 676 to the connecting element 652 and to chips 611 and 613. Some or all of the active terminals 672 may be directly connected by solder balls 622a to interconnect terminals 670 on the connecting element. Stated another way, some or all of the active terminals may also serve as interconnect terminals. Some of the large solder balls 622b (FIG. 16) also connect the continuous metal layer and thermal conductor 620 with the ground bus 691 of the connecting element or upper chip carrier 652. The large solder balls 622 are located outside of the area in which lower chip 613 is attached to upper chip carrier 652, desirably flanking a plurality of the peripheral edges of lower chip 613. One or more discrete devices 686, e.g. passive electronic components such as capacitors, resistors and inductors, are bonded to additional element mounting terminals 676 of the lower chip carrier 660, and are connected to one or both of the chips 611, 613 through some of the interconnect terminals 670 and 671 and large solder balls 622. In this embodiment, the discrete device 686 is disposed outside of the region covered by the connecting element or upper chip carrier 652 and projects upwardly to or beyond the level of the connecting element 652. This arrangement allows the package to accommodate relatively thick discrete devices while maintaining a relatively small overall package height.

The use of solder balls to form the connections between bottom plane element or lower chip carrier and the connecting element or upper chip carrier avoids the need for bond windows in the connecting element or in the bottom plane element, which reduces the cost of these elements. Moreover, such connection is also desirable as it avoids a need for the connecting element to be selectively metallized.

The package of FIGS. 15 and 16 can be assembled by first bonding chips 611 and 613 to connecting element 652 and then bonding the connecting element 652 to lower chip carrier 660 using solder balls 622. The rear surface of lower chip 611 is desirably bonded to the thermal conductor of 620 the lower chip carrier 660 at the same time that the connecting element 652 is bonded to lower chip carrier 660. Thereafter, the resulting assembly may be encapsulated so as to form an encapsulant mass 618 overlying the surfaces of the connecting element 652 and extending between the lower chip carrier 660 and the connecting element 652. Discrete component 686 can be bonded to terminals 676 at any time prior to encapsulation. An alternative assembly process involves aligning upper and lower chips, the connecting element 652 and lower chip carrier or bottom plane element 660 and then reflowing the aligned elements to form bonded connections between the elements of the assembly in one step.

In use, the active terminals 672, thermal conductor 620 and, optionally, the additional element terminals 676 of the lower chip carrier 660 are bonded to corresponding terminals of a circuit board or other circuit panel by thin masses or layers of solder or other bonding material forming a land grid array, in the same manner as discussed above. Here again, the thermal conductor or continuous layer 620 desirably is mounted to a large, grounded pad on the circuit panel so that the thermal conductor serves as both a ground connection and an RF shielding element. In a variant of this embodiment, the thermal conductor may be omitted and the rear surface of the lower chip may be exposed at the bottom surface of the package, so that the rear surface of the lower chip is bonded directly to the circuit panel when the package is mounted to the panel.

Figure 17:
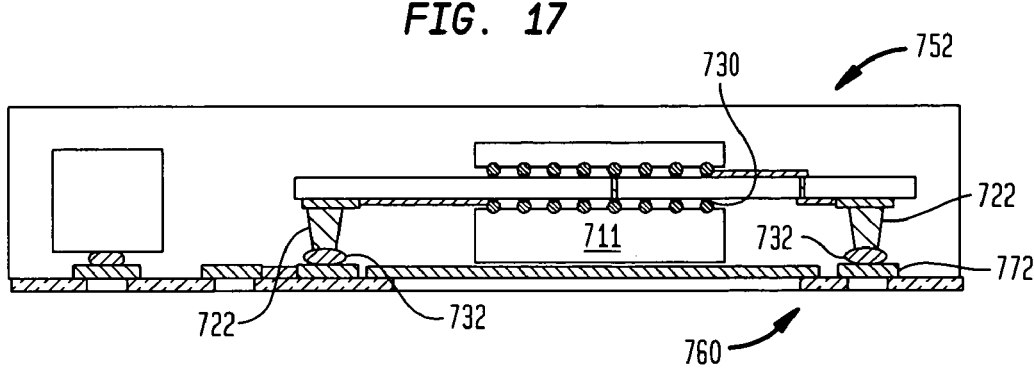
FIGS. 17–18 are diagrammatic sectional views of packaged chips according to yet other embodiments of the invention.

The embodiment of FIG. 17 is identical to the embodiment shown in FIGS. 15 and 16 except that posts 722 extending from upper chip carrier 752 are provided for interconnecting the upper chip carrier 752 to the lower chip carrier 760, in place of the large solder balls 622 shown in FIGS. 15 and 16. Posts 722 are desirably formed of copper or other metallic material by etching in a manner such as that described in U.S. Pat. No. 6,177,636 and in commonly assigned U.S. Provisional Application No. 60/508,970 filed Oct. 6, 2003, serial number not yet assigned, the disclosures of which are hereby incorporated herein by reference. The lands 730 used for interconnection with lower chips 711 may be formed by the process disclosed in such provisional application for lowering the height of initially formed metal posts.

Figure 18:
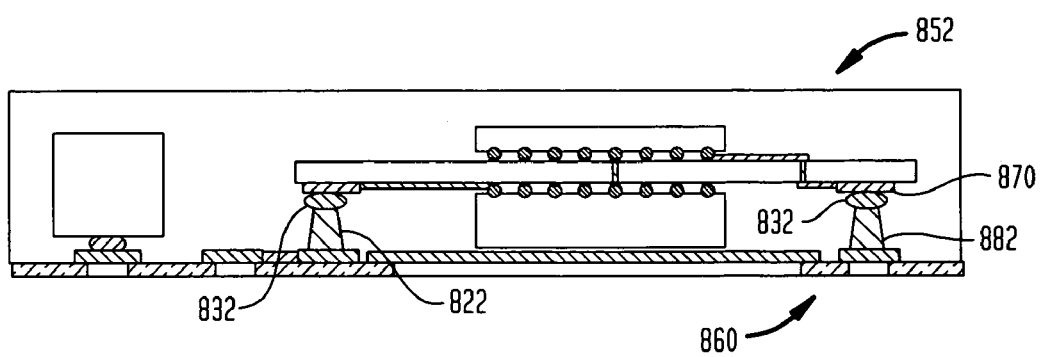

Desirably, the copper posts 722 are plated with an adhesion-promoting metal such as nickel, and then gold for corrosion resistance. The gold-plated posts 722 are then bonded by masses 732 of bonding material, e.g. solder, tin, eutectic composition, etc., to terminals 772 of the lower chip carrier 760. The embodiment of FIG. 18 is identical to the embodiment shown in FIG. 17 except that through posts 822 are formed to extend upwardly from the lower chip carrier 860 instead of downwardly from the upper chip carrier 852. Posts 822 are joined to corresponding terminals 870 of the upper chip carrier 852 by bonding material 832.

Figure 19:
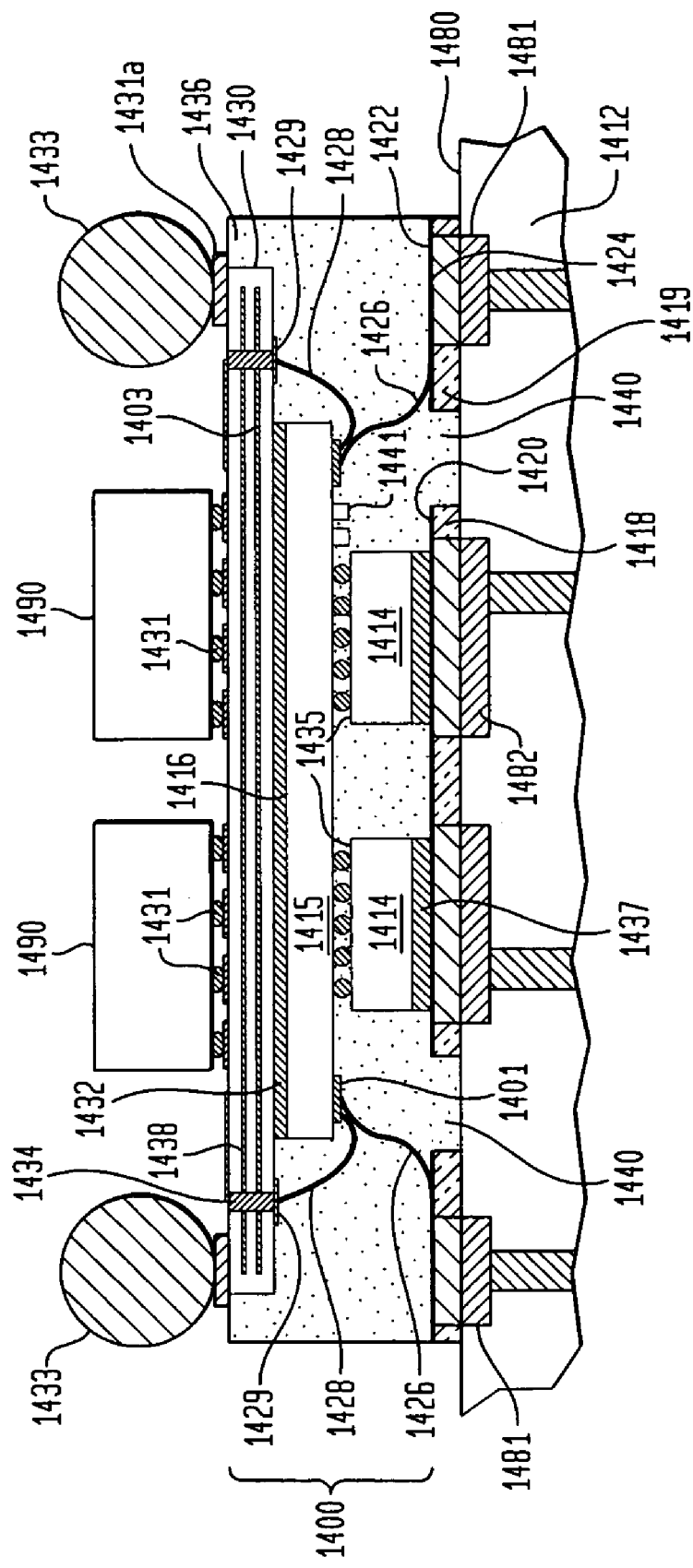

FIG. 19 illustrates an assembly 1400 according to another embodiment of the invention in which in which one or more chips 1414, 1415 are disposed in an interior space between a lower package element or bottom plane element 1418 and an upper package element or connecting element 1430. In the particular embodiment shown, the lower package element 1418 can be a chip carrier which includes a sheet-like dielectric element 1419 having a patterned metal conductive layer 1420 disposed on the top surface of such dielectric element. This metallic layer defines lower terminals 1422 exposed through holes in dielectric layer 1419 at a bottom surface 1424 of the lower chip carrier 1418 for interconnection to elements below the bottom surface. Metallic layer 1420 also includes a thermal conductor such as the thermal conductor described above with reference to FIG. 15, the thermal conductor being exposed at the bottom surface of the lower chip carrier by way of holes in dielectric layer 1418. Here again, the thermal conductor optionally may be in the form of a substantially continuous layer which extends around other components of the metallic layer and which provides a large ground plane as discussed above. In other variants, other package elements such a lead frame; a sheet-like dielectric element having a metallic layer on its bottom surface or having plural metallic layers; or a multilayer circuit panel having multiple dielectric layers and having one or more conductive layers, such as those described above and those described in the '509 application, may be used as the lower package element.

One or more of the chips is a passive chip 1415 as discussed above having integrated passive devices. In addition, the passive chip can be provided with one or more discrete passive devices 1441 mounted to the front contact-bearing surface 1417 of the passive chip. One or more chips is an "active chip" 1414 having one or more integrated active devices. The passive chip 1415 is desirably flip-chip attached to the active chips 1414 through a surface mount means such as a solder ball or solder bump array, land grid array, etc. Active chips 1414 have upwardly facing front contact-bearing surfaces 1435 and downwardly facing rear surfaces 1437 which are disposed in contacting relation to the lower chip carrier 1418.

The downwardly-facing rear surfaces 1437 of the active chips 1414 are desirably mounted to the metallic layer 1420 of the lower chip carrier 1418 by a bonding material 1432 having a high thermal conductivity as, for example a metallic bonding material. The passive chip 1415 has a rear surface 1416 which is mounted to upper chip carrier 1430. Upper chip carrier 1430 is disposed above the passive chip 1415. In FIG. 19, the upper chip carrier 1430 is depicted as a multilayer panel having a plurality of layers of metallic features 1438 including traces, bond pads 1429 on its bottom surface, terminals 1431 on its top surface and vias 1434 extending within and through the panel such that the traces and vias conductively interconnect at least some of the bond pads 1429 with at least some of the terminals 1431. The metallic features 1438 of the top chip carrier desirably include a substantially continuous conductive plane such as a thermal spreader 1403 or other features sufficient to form a barrier to electromagnetic radiation at the operating frequencies to be employed in the assembly. Other forms of package elements such as, for example, a lead frame or a sheet-like dielectric element having one or more metallic layers can be used. Preferably, these other forms include similar features.

Preferably, the upper chip carrier 1430 has larger area than the upper or passive chip 1415 and overhangs the upper chip 1415 relative to at least one edge thereof.

As shown in FIG. 19, some of all of the contacts 1401 on passive chip 1415 are electrically connected to the lower chip carrier 1418 by way of bottom leads 1426. The bottom leads 1426 may include wire bonds and/or leads formed integrally with traces of the lower chip carrier 1418. For example, bottom leads 1426 may be formed integrally with terminals 1422, as parts of the metallic layer 1420. These leads may be deformable leads and may have ends temporarily held in place relative to dielectric element 1419 by frangible elements. Examples of such frangible leads are described above with reference to FIG. 11. In the same manner as discussed above with reference to FIG. 11, bond windows 1440 can be provided in the dielectric element of the lower chip carrier. During assembly, a tool inserted through the bond window detaches the lead 1426 from its frangible connection to the dielectric element of the chip carrier 1418, bends the lead and attaches the lead to a contact pad on passive chip 1415.

As further shown in FIG. 19, the passive chip 1415 is interconnected to the upper chip carrier 1430 by way of top leads 1428 in the form of wire bonds. The top leads 1428 are connected between the contacts 1401 of the upper or passive chip 1415 and bond pads 1429 on the upper chip carrier. The bond pads, in turn, are conductively interconnected to the terminals 1431 on the upper surface of the chip carrier 1430.

The top leads 1428 and bottom leads 1426 may be arranged to connect some or all of the terminals 1431 of the upper chip carrier with some or all of the terminals 1422 of the lower chip carrier. Some or all of such connections may be "straight-through" connections, without passing through any functional element of chips 1414 and 1415. For example, where both a top lead and a bottom lead are connected to a common contact 1401 of the passive chip, or to two contacts 1401 which are connected by a low-resistance conductor on the passive chip, a straight-through connection is made. Other interconnections can be arranged so that signals passing between conductive elements of the top and bottom interposers are routed through one or more functional elements of the chips.

An encapsulant 1436 is desirably provided between the upper chip carrier 1430 and the lower chip carrier, the encapsulant being provided and having characteristics as described above. The assembly of FIG. 19 may be formed by first making a subassembly including chips 1414 and 1415; then bonding the subassembly to the upper chip carrier 1430 with bonding material layer 1432 and wire-bonding some or all of the contacts 1401 of the chip 1415 to contact pads 1429 of the upper chip carrier with top leads 1428. After the wire-bonding step, the bottom chip carrier is placed onto the rear surfaces 1437 of lower chips 1414, and bottom leads 1426 are connected to some or all of the contact pads 1401 of the upper or passive chip. The encapsulant is then introduced between the upper and lower chip carriers. Some or all of these steps may be performed while the upper chip carrier, lower chip carrier, or both are parts of larger tapes or sheets which are severed during or after assembly to provide individual units, each including one or more assemblies 1400.

The assembly 1400 can be mounted to a circuit panel having contact pads 1481 and thermal conductor mounting elements 1482 disposed at a contact surface 1480 thereof, using a solder bonding process or other metallurgical bonding process similar to those discussed above to form metallic connections between terminals 1422 of lower chip carrier 1418 and contact pads 1481 and larger connections between the thermal conductor of the lower chip carrier and thermal conductor mounting elements 1482 of the panel. As described above, the thermal conductor and the mounting elements 1482 of the panel provides thermal communication with the assembly at rear surfaces of active chips 1414 over a large area and spreads the heat transferred from the active chips into the circuit panel.

One or more additional chips or other microelectronic elements 1490 may be mounted on the terminals 1431 of the upper chip carrier. Typically, the additional elements will be arranged to interact with the chips within the assembly. As illustrated, the chips 1490 are flip-chip attached to the upper chip carrier 1430 through a surface mount technique such as a solder ball grid array or land grid. Alternatively, chips 1490 can be mounted face up over the upper chip carrier, and interconnected to upper chip carrier terminals 1431 through wire bonds and the like.

In a particularly preferred arrangement the chips 1414, 1415 disposed in the spaced between the upper and lower chip carriers include one or more emission chips which emit or radiate energy at radio frequencies. A radio frequency power amplifier ("RFPA") is an example of an emission chip. RFPAs amplify analog signals of radio frequencies, generally to provide the signals to an antenna for transmitting them over the air or through other generally nonconductive medium as an electric wave. Although substantially all of the amplified output of an RFPA is generally intended to be coupled by way of a conductive line to such antenna, it may still be the case that some radio frequency energy is emitted or radiated as an electric wave from the chip or the conductive line. In this case, the additional microelectronic elements 1490 desirably include one or more functional elements related to receiving or processing signals. Without limitation, such functional elements include RF receivers, low noise amplifiers, filters, RF mixers, IF mixers, samplers, oscillator, and signal processor. Where upper chip carrier 1430 includes a ground plane such as thermal conductor 1403 or other shielding element, it will substantially block stray RF emission from the chips 1414, 1415 disposed between the chip carriers into the space above the upper chip carrier, and hence protect additional microelectronic elements 1490 from such stray emissions. The thermal conductor and other conductive components of the lower chip carrier 1418 likewise substantially block stray RF emission downwardly from the space between the chip carriers. The leads 1426, 1428 may substantially block RF emission toward the edges of the assembly as, for example, where the spacing between grounded leads is less than the wavelength of the RF emission. In some cases, it may be desirable to provide either additional grounded leads extending between the upper and lower chip carriers or other conductive elements such as a continuous or nearly continuous conductive wall structure extending from the vicinity of the upper chip carrier to the vicinity of the lower chip carrier so as to block RF emission toward the edges. In other cases, where the vertical distance between the conductive elements of the upper and lower chip carriers is less than the wavelength of the RF radiation, these elements alone will substantially block edgewise emission. It should be appreciated that in FIG. 19, as in the other drawings, the size of the assembly, and particularly the vertical dimensions of the assembly, are greatly exaggerated for purposes of illustration. Merely by way of example, the actual vertical distance between the chip carriers may be about 1–2 millimeters or even less.

Additional microelectronic elements 1490 may be mounted to an assembly 1400 so as to form a larger pre-assembled module, which can then be handled and assembled to the circuit panel. In a further variant, the additional elements mounted atop upper chip carrier 1430 may include another multi-chip assembly. For example, in the particular embodiment of FIG. 19, terminals 1431 of the upper chip carrier include terminals 1431a provided in a pattern corresponding to the pattern of terminals 1422 of the lower chip carrier, so that another complete assembly identical to assembly 1400 can be mounted on these terminals in addition to microelectronic elements 1490 or in lieu thereof. For example, large solder balls 1433 can be used to support another assembly (not shown) over elements 1490. Multiple assemblies 1400 may be stacked one atop the other, either as a preassembled unit or during assembly to a circuit panel.

Figure 20:
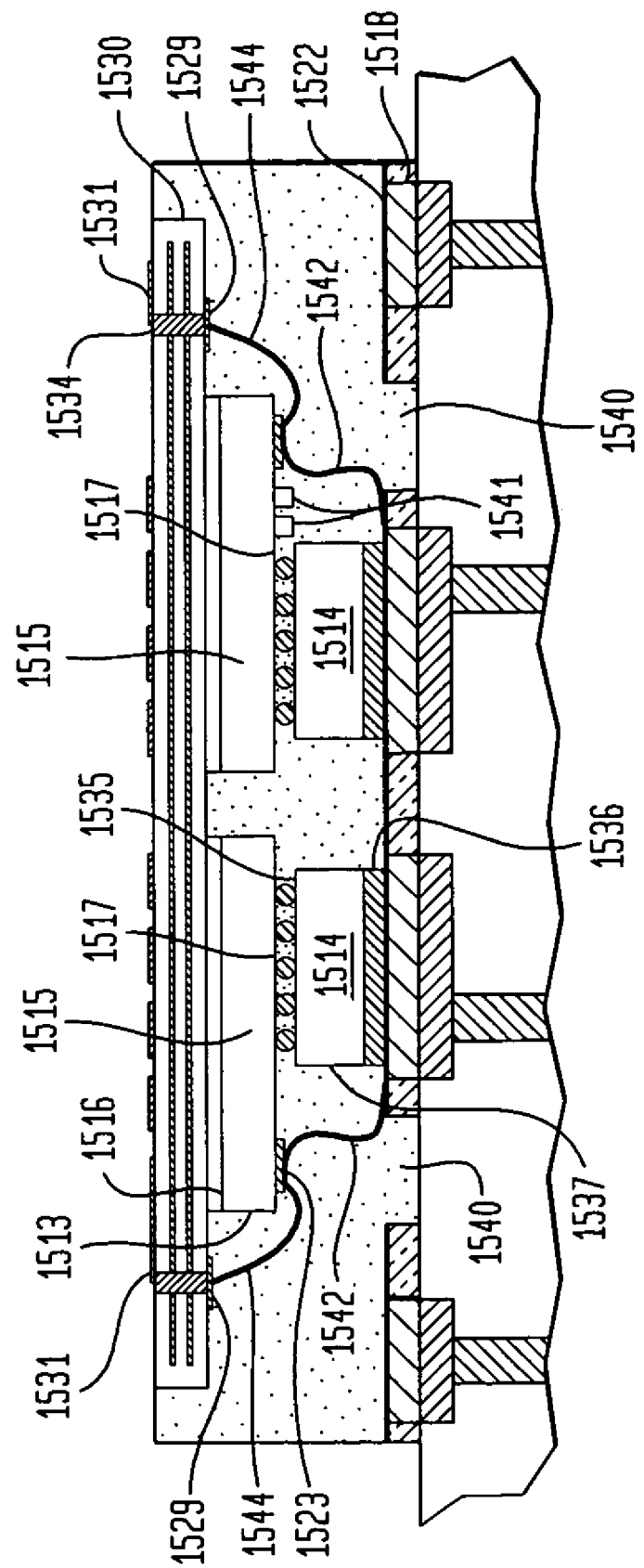

The 1500 assembly of FIG. 20 is similar to the assembly 1400 of FIG. 19 except as discussed below. In the assembly 1500 of FIG. 20, a plurality of upper chips 1515 such as passive chips are disposed above a plurality of lower chips such as active chips 1514. Chips 1515 and 1514 are connected to on another. Portions of the front surfaces of the upper chips 1515 overhang and extend beyond the edges of the lower chips 1514. In this embodiment as well, a plurality of leads interconnect the lower chip carrier 1518 to the passive chips 1515 and connect the passive chip to the upper chip carrier 1530. Here again, the leads include bottom leads 1542 which interconnect the terminals 1522 on the lower chip carrier 1518 to contacts 1523 of the passive chips 1515, and top leads 1544 which interconnect the contacts 1523 of the passive chips to bonding pads 1529 of the upper chip carrier and hence to terminals 1531. In this embodiment, some or all of the top leads 1544 are formed integrally with bottom leads 1542. As discussed above, the bottom leads 1542 can be formed integrally with features of the metallic layer on the lower chip carrier such as traces or terminals 1522 and bonded to terminals 1523 by a bonding tool. In such case, top leads 1544 can be continuations of the leads 1542, bonded to terminals 1529 by the bonding tool. The bonding window 1540 of lower chip carrier 1518 is made large enough to accommodate the required lead length. Leads of this type inherently provide a straight-through connected between the bottom chip carrier and the top chip carrier. The lead-forming techniques discussed above with reference to FIG. 19 may be used to form other leads.

FIG. 21 illustrates another variation of the assemblies shown and described in FIGS. 19 and 20. In the assembly of FIG. 21, the bottom leads 1642 again extend between conductive features of the lower chip carrier and the contacts of the upper chip. However, some or all of the top leads used in the embodiments of FIGS. 19 and 20 are replaced by interconnect leads 1644 extending directly from the lower chip carrier 1618 to the upper chip carrier 1630. Again, leads 1642, 1644 can be formed integrally with conductive features of the lower chip carrier 1618 and can be bonded by a tool pressed against the leads through bond windows 1640. Alternatively, the leads can be discrete leads, such as wire-bonds, or a combination of discrete leads and leads formed integrally to the lower chip carrier. When the leads are formed integrally to the lower chip carrier, they can be placed at different locations along an axis perpendicular to the cross-section which is illustrated in FIG. 21. In such manner, a bonding tool can select one of the leads and bond it to the upper chip 1615 so as to form a bottom lead 1642. Then, at a different time, the bonding tool can select another lead and bond it to the upper chip carrier 1630 so as to form an interconnect lead 1644. Where the assembly includes only bottom leads and interconnect leads as shown in FIG. 21, connections between the top chip carrier 1630 and the chips can be made by providing sets of leads, each including a bottom lead 1642 and an interconnect lead 1644, the leads of each such set being connected to one another by a conductive feature on lower chip carrier 1618. For example, both leads of such a set may be connected to the same terminal 1622 of the lower chip carrier. Alternatively, both leads may be connected by a trace (not shown) but isolated from terminals 1622.

FIG. 22 illustrates another variation in which an upper or passive chip 1715 is disposed in a recess of an upper chip carrier 1730. The contact pads 1729 of the upper chip carrier are substantially coplanar with the contacts 1701 of the upper chip 1715. In this embodiment, the upper chip carrier desirably is a substrate-type element such as a ceramic substrate. A recess is formed in the upper chip carrier 1730 as by molding a precursor material into a substrate having the desired shape according to known processes. Alternatively, the substrate can first be formed and then material be removed to form the recess 1702, as by etching or mechanical milling. In a further alternative, the upper chip carrier can be formed by uniting a ring-shaped substrate having conductive features defining the contact pads 1729 of the upper chip carrier with a generally planar substrate so that the ring-shaped substrate defines the recess and so that conductive features 1710 of the planar substrate are connected to the contact pads 1729.

Bottom leads 1742 and top leads 1744 interconnect the lower chip carrier 1718 to the upper chip 1715 and the upper chip carrier 1730. The leads can be formed integrally to the lower chip carrier and bonded by lead deformation as described above. The bottom and top leads 1742 and 1744 can be individual leads or have a continuous strip construction, such as that described above with reference to FIG. 20. The substantially coplanar configuration of the upper chip contacts 1701 and upper chip carrier contact pads 1729 facilitates the bonding operation. Alternatively, the leads 1742, 1744 can be wire-bonds or any of the other lead configurations discussed above. In a further variant, (FIG. 23) a planar upper chip carrier substrate 1830 can be provided with contact pads 1829 in the form of posts which project from the bottom surface of such substrate. When the upper chip 1815 is disposed on the bottom surface of such substrate, the posts are disposed adjacent one or more edges of the upper chip, and the tips of the posts are substantially coplanar with the contacts 1801 of the upper chip.

Another variation is illustrated in FIG. 24. As shown in FIG. 24, the upper chip carrier 1930 and the lower chip carrier 1918 are portions of a folded dielectric sheet 1919 having a patterned metal layer 1920 such as the tapes described above. Stated another way, a single sheet having a patterned metal layer 1920 thereon is folded to provide the lower chip carrier 1918 and the upper chip carrier 1930. Thus, the boundary between the upper and lower chip carriers is a fold 1921 in the sheet. Microelectronic packages incorporating folded sheets, as well as methods of making the same, are described in further detail in, for example, certain embodiments of co-pending, commonly assigned U.S. patent application Ser. Nos. 10/077,388; 10/281,550; 10/654,375; 60/408,644 and 60/443,438 and PCT International Application PCT/US03/25256, the disclosures of all of such applications being hereby incorporated by reference herein, as well as in certain embodiments of U.S. Pat. No. 6,225,688, the disclosure of which is also incorporated by reference herein.

In the embodiment of FIG. 24, the upper or passive chip 1915 has a rear surface 1932 mounted to the inner or downwardly-facing surface of the upper chip carrier 1930 and a front surface 1917 having contacts to which the active chips 1914 are flip-chip attached, as described above. The lower chip carrier 1918 has a bottom surface at which a plurality of terminals 1922 are exposed. Likewise, the upper chip carrier 1930 has an upper surface at which a plurality of terminals 1924 are exposed.

In one manufacturing process, the active chips 1914 are mounted to the passive chip 1915. Then, the mounted chips are attached, as by an encapsulant or thermally conductive bonding material 1938 to a thermal conductor or ground plate included in the metal layer 1920 on that portion of the dielectric sheet which will form the lower chip carrier 1918, after which the dielectric sheet is folded and the rear surface 1932 of the upper or passive chip 1915 is attached to the upper chip carrier 1930. Alternatively, the assembled chips 1914, 1915 can be mounted by first mounting the rear surface 1932 of the passive chip 1915 to the upper chip carrier 1930, then folding the sheet 1919, and then mounting the rear surface 1934 of the active chips to the metal layer 1920 of the lower chip carrier 1918.

A plurality of bottom leads 1942 interconnect the lower chip carrier 1918 to the passive chip 1915. As shown, the leads 1942 can be formed integrally to the lower chip carrier and bonded to the passive chip 1915 by a bonding tool deforming each lead through a bond window 1940, after the sheet 1919 has been folded to form the upper and lower chip carriers. As in the embodiments described above with reference to FIG. 19, the chips 1914 and 1915 desirably include one or more emission chips such as RFPAs. As in the embodiments discussed above with reference to FIG. 19, the combination of the conductive features on the upper and lower chip carriers and other features such as the leads 1942 extending between the lower chip carrier 1918 and the passive chip 1915 provide a level of shielding to substantially prevent radio frequency radiation from passing between the interior space between the upper and lower chip carriers 1918, 1930 and the space external thereto. To provide still further RF shielding, the tape may include a shielding features such as a substantially continuous ground plane extending between the chip carriers and hence extending along the fold 1921. The tape may include one or more additional conductive layers as discussed below in connection with FIG. 26 to provide the shielding features. Here again, additional conductive elements such as additional leads extending between the upper and lower chip carriers remote from the fold may be provided for additional RF shielding.

Electrical interconnection between the active chips 1914 and the passive chip 1915 is through the contacts provided on front surfaces 1917, 1935 of the passive chips and active chips. Interconnection between the lower chip carrier 1918 and the passive chip 1915 is through bottom leads 1942 extending from the terminals 1922. In this embodiment, no separately-formed leads are required to interconnect terminals 1922 of the lower chip carrier 1918 with terminals 1924 of the upper chip carrier 1930, since the folded sheet constituting upper and lower chip carriers have a patterned metal layer 1920 thereon which provides the interconnection in the form of traces extending along the sheet and extending around fold 1921. Desirably, selected ones of the terminals 1922 are selectively interconnected only to selected ones of the terminals 1924 by the patterned metal layer 1919, such that paths for signals are provided between the upper chip carrier and lower chip carrier, as well as paths for common interconnections such as power and ground.

Figure 25:
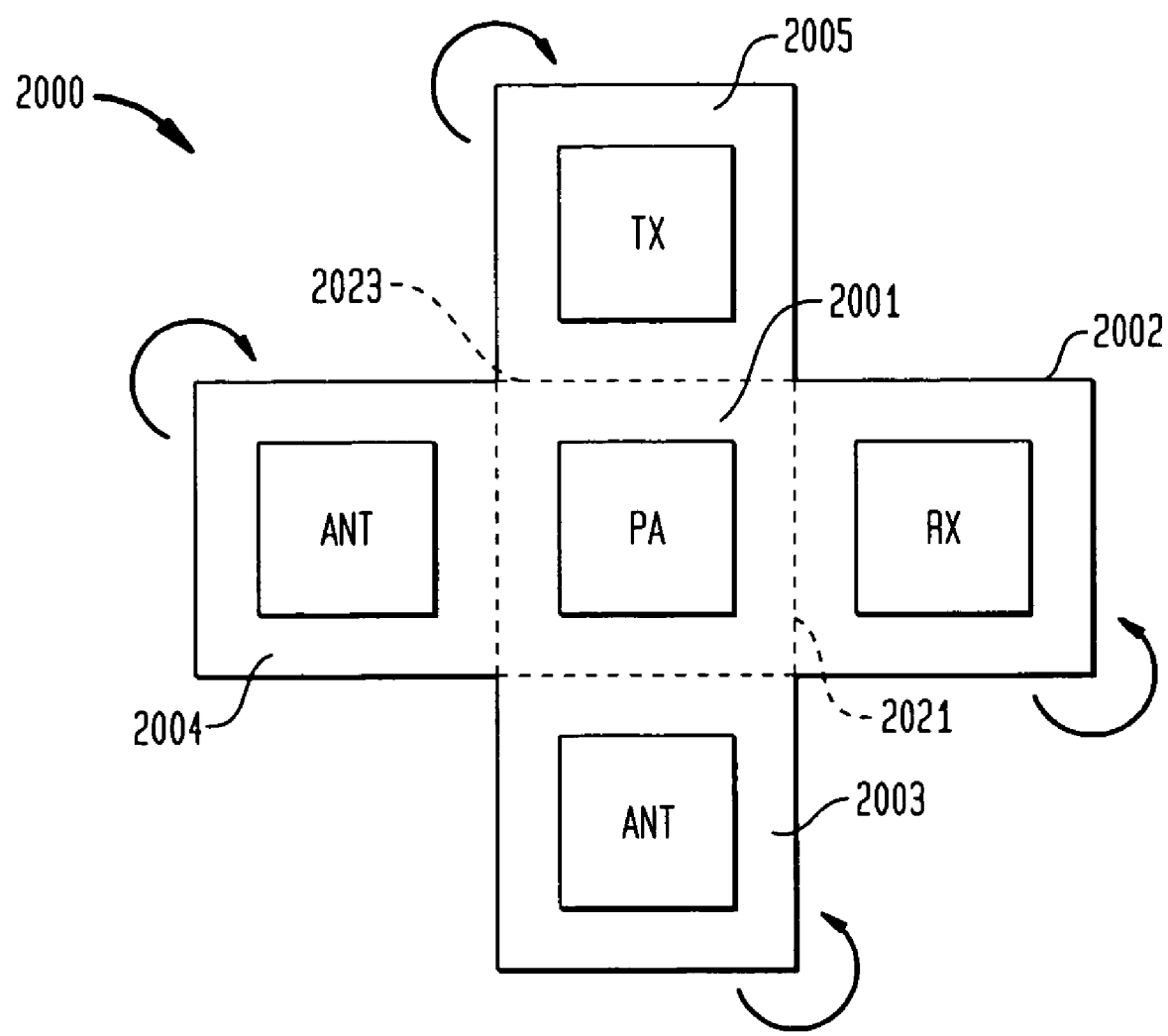
FIG. 25 is a high-level diagrammatic plan view of packaged chips according to an embodiment of the invention.

FIG. 25 is a plan view illustrating an embodiment in which a plurality of carriers including chip carriers are provided as a set of flaps of a foldable dielectric sheet 2000 having a patterned metal layer thereon (not shown). Such dielectric sheet and patterned metal layer are generally as described above with reference to FIG. 24. The carriers 2001, 2002, 2003, 2004, and 2005 support a plurality of functional blocks, each having chips mounted thereto or other electronic elements thereon, for example an antenna. Each carrier of sheet 2000 has a structure and function as that of a lower chip carrier or upper chip carrier of a multi-layer fold-stack package, such as that described above relative to FIG. 24. Each of the carriers is patterned to support a functional block, which may be unique within the particular dielectric sheet 2000 or be the same as that of another chip carrier. In an embodiment, the portions of the dielectric sheet 2000 can be patterned to support a power amplifier (PA) 2001, receiver (RX) 2002, antenna (ANT) 2004, and transmitter (TX) 2005. The block "ANT" on carrier 304 represents an antenna which desirably can be formed integrally with the carrier, such as in a pattern of electrically conductive traces on the dielectric sheet. While not shown in the particular view of FIG. 25, the portions of the dielectric sheet 2000 are interconnected by wiring patterns in the metal layer as described above with reference to FIG. 24. The dielectric sheet 2000 is arranged in a generally cruciform pattern intended to be folded at folds 2021 to form a multi-layer fold-stack chip package having five superposed layers. Cruciform folded packages are described, for example, in copending, commonly assigned U.S. patent application Ser. No. 10/077,388, the disclosure of which is hereby incorporated by reference herein.

In order to reduce interference from the power amplifier, the receiver carrier 2002 is desirably folded in a manner such that it is shielded from radiation emitted by the power amplifier and/or antenna carriers 2001, 2003, and 2004 of the package. For example, the receiver chip carrier 2002 is folded such that chips mounted to that carrier 2002 face away from the chips mounted to the carrier 2001 for the power amplifier. The transmitter carrier 2005 is folded over the folded receiver carrier 2002, preferably such that the chips of the transmitter carrier face away from the chips on the receiver carrier. Thereafter, the antenna carriers 2003, 2004 can then be folded over the three-level stack of power amplifier, receiver and transmitter such that the antenna lies on an upwardly facing surface of the folded package. In each case, an electrically conductive shielding element incorporated in at least one of the carriers lies between the source of emissions, such as PA 2001 or antenna 2003, and the chips or other components to be protected from emission.

Figure 26:
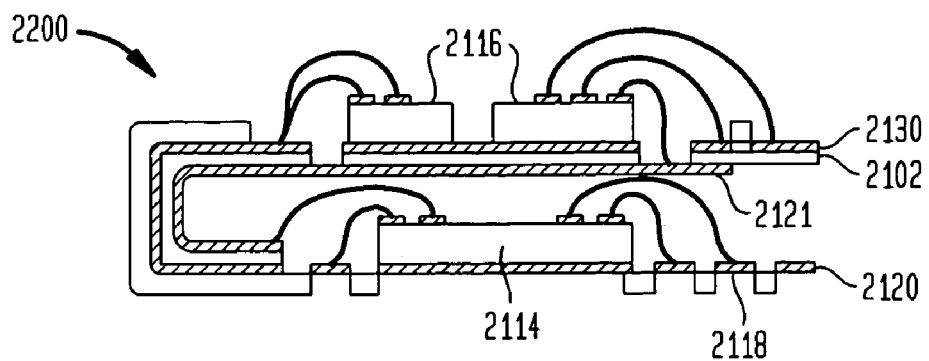
FIGS. 26–28 are diagrammatic sectional views of packaged chips according to still further embodiments of the invention.
Figure 27:
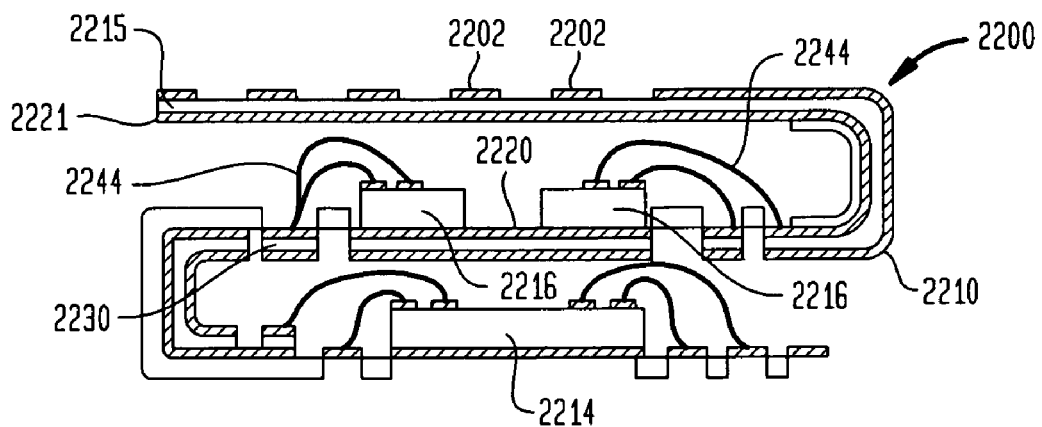
Figure 28:
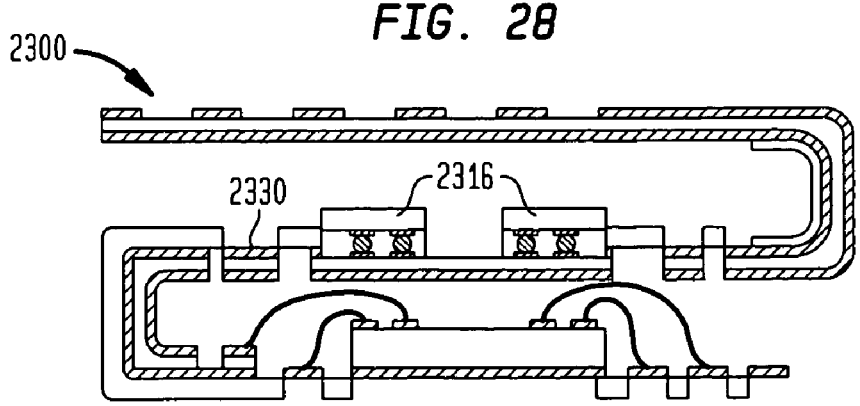

FIGS. 26–28 illustrate other variations in fold-stack packages according to embodiments of the invention. As shown in FIG. 26, a two-layer fold-stack package 2100 is constructed from a dielectric element 2102 having two metal layers 2120 and 2121. The package includes an upper chip carrier 2130, a lower chip carrier 2118 formed integrally to the upper chip carrier, one or more upper chips 2116 disposed above the upper chip carrier and one or more lower chips 2114 disposed between the upper and lower chip carriers. Desirably, lower chip 2114 includes an RFPA or other emission source. Upper chips 2116 desirably include one or more functional elements related to receiving or signal processing function as discussed above in connection with FIG. 19.

A first metal layer 2120 of the sheet is patterned, serving to interconnect chips and/or other elements to each other. The second metal layer 2121 is substantially continuous over a broad area of the sheet, serving as a ground plane, or alternatively, a conductive backplane. Because of its continuity, the second metal layer 2121 serves as an electromagnetic shield for lower chip 2114 and components in the interior space between the upper chip carrier 2130 and the lower chip carrier 2118. As shown in FIG. 26, the chips are mounted in face-up position and interconnected to respective portions of metallic layers of the folded sheet with wire-bonds.

In a further variation shown in FIG. 27, a three-level fold-stack package is provided. In this variation, a unitary metallic sheet element 2200 is provided, having a first metal layer 2210, a dielectric layer 2215 adhering thereto, as well as patterns formed in a second metal layer 2220 adhering to the dielectric layer opposite the first metal layer 2210. The unitary metallic sheet element is folded twice to provide the structure shown in FIG. 27. An antenna is provided as a set of patterns 2202 in a cap panel 2210 of the package that is exposed and faces outwardly. The antenna incorporates a spiral coil, dipole or other pattern of conductors. Alternatively, the antenna can be such as that described in the '509 application. As described above with respect to FIG. 26, a substantially continuous portion 2221 of metal layer 2220 functions as a shielding element and desirably also a ground plane, to substantially block the radiation of radio frequency energy. In particular, radio frequency energy radiated from antenna patterns 2202 are blocked from reaching the upper chips 2216 disposed between the metal layer 2221 and the upper chip carrier 2230. In addition, the leads 2244 extending between terminals of the upper chip carrier 2230 and the upper chips 2216 may also help to block the radiation from reaching the chips 2216. Moreover, the metal layer 2221 and the leads 2244 also substantially block radiation emitted by the upper chips 2216 from reaching the area above the metal layer 2221.

In an embodiment, the lower chip 2214 includes a functional element having a radio frequency transmitter function such as a radio frequency transmitter, radio frequency power amplifier (RFPA), and/or a transmission filter. Upper chips 2216 desirably include one or more functional elements related to receiving and/or signal processing function. Without limitation, such functional elements include RF receiver, low noise amplifier, filter, RF mixer, IF mixer, one or more analog digital converter elements, e.g. sampler (sample and hold circuit), quantizer, oscillator, and signal processor. Alternatively, or in addition thereto, upper chips 2216 include control circuitry for the RFPAs such as transmitter control circuitry, which may be digital chips provided in complementary metal oxide semiconductor (CMOS) technology or "biCMOS" chips including both bipolar and CMOS transistors, for example.

Preferably, the RFPA outputs sufficient energy to the antenna to permit transmission of communication signals over commonly available wireless interfaces. Thus, The RFPA is adapted to output at least 10 milliwatts radio frequency power, more preferably 100 milliwatts or more, and most preferably 500 milliwatts or more power.

In an embodiment, the upper chips 2216 include one or more surface acoustic wave (SAW) filter devices adapted for use in a receiver of radio frequency signals. Such SAW filter device is desirably mounted to the chip carrier as described in co-pending U.S. Provisional Patent Application No. 60/449,673, incorporated by reference herein.

The package including the lower chips 2214, upper chips 2216 and antenna can be made desirably thin, such that each chip carrier and cap panel has a thickness of about 200 µm or less, each chip has a thickness of less than about 200 µm, and the area of each chip ranges below about 0.5 cm². Thus, a package including these elements ranges below about $[(3\times0.2)+(2\times0.2)]\times0.5$ (cm³)=0.5 cm³.

FIG. 28 illustrates a variation of the package structure 2300 shown in FIG. 27, in which the upper chips are flip-chip attached by a surface mount technique to the patterned metal layer of the upper chip carrier 2330, rather than wire-bonded as shown in FIGS. 26–27.

Desirably, the package structure according to any of the variations illustrated in FIGS. 25–28 is incorporated in a portable electronic communication device, such as a handset. For example, the package structure can be incorporated in a handset of a cellular mobile communication device such as a cellular telephone, or alternatively, a cellular mobile data terminal such as a portable digital assistant having a wireless communication interface.

Figure 29:
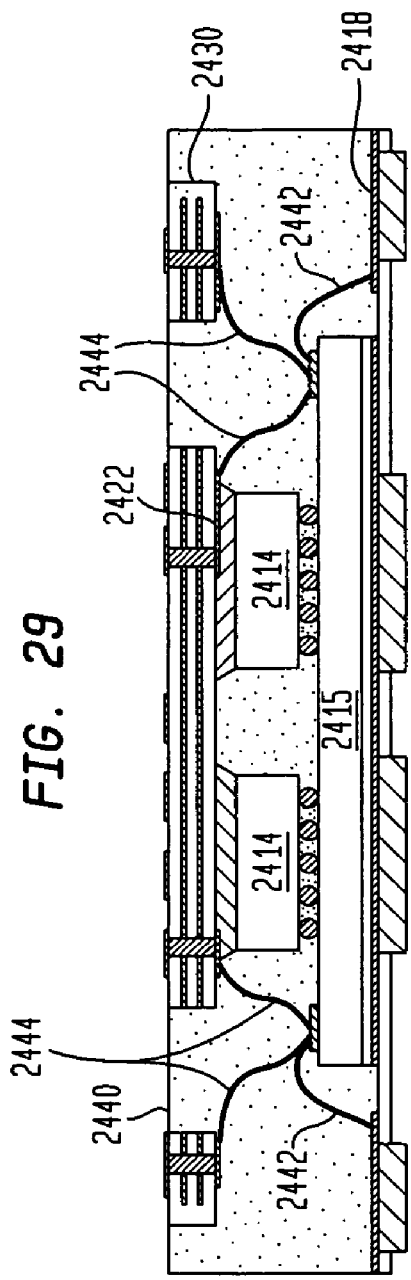
FIGS. 29–31 are diagrammatic sectional views of packaged chips according to yet other embodiments of the invention.
Figure 30:
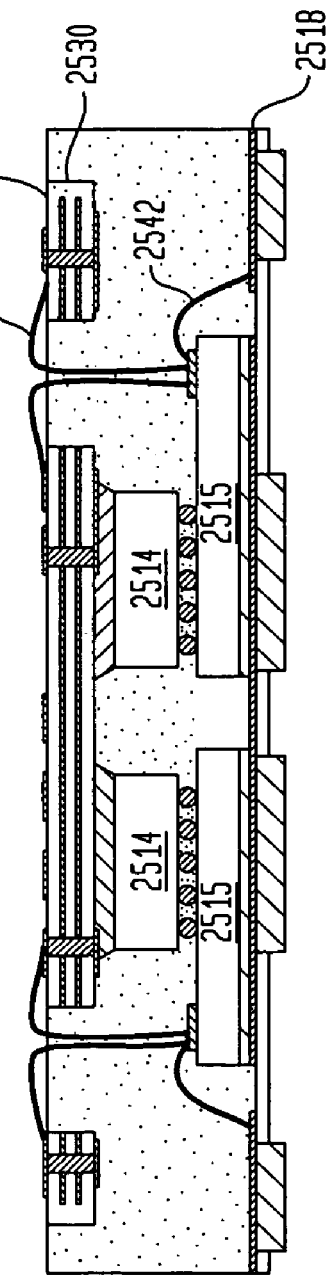
Figure 31:
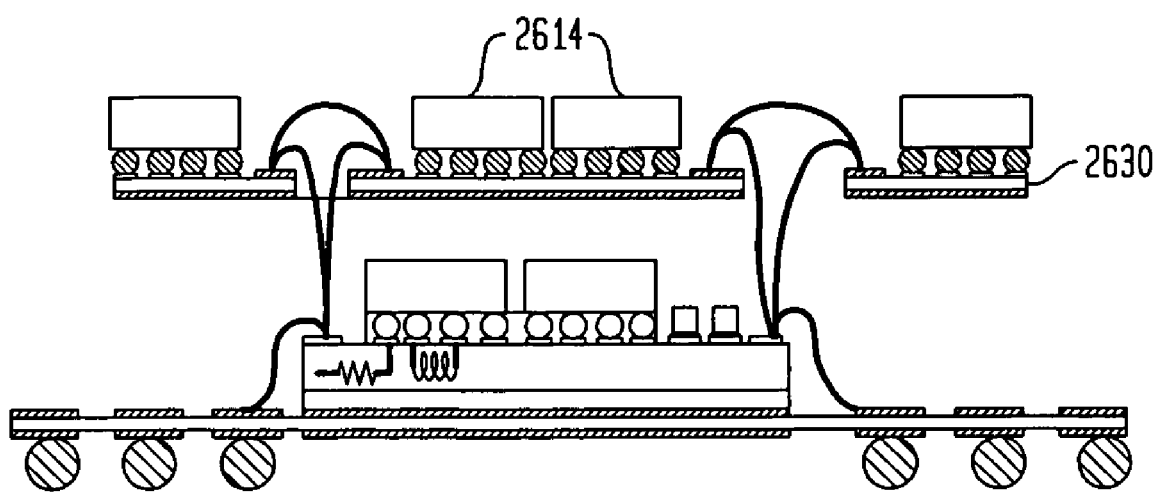

FIGS. 29 and 30 illustrate variations of the embodiments shown in and described above with reference to FIGS. 19–23 but in which the larger, passive chip 2415 is mounted to a lower chip carrier 2418. In this embodiment, the active chips 2414 are flip-chip attached to the passive chip. As shown in FIG. 29, top leads 2444 are formed integrally to traces 2422 on the bottom surface of the upper chip carrier 2430. The top leads are interconnected to the passive chip 2415, as by deformation by a bonding tool through a bond window 2440 provided in the upper chip carrier 2430. Bottom leads 2442 are provided as wire-bonds. As shown in FIG. 30, a plurality of passive chips 2515 are provided. The top leads 2544 extend from an upper surface 2532 of the upper chip carrier 2530, which is provided as a multi-layer substrate-type carrier. In such case, the top leads 2544 are interconnected to the passive chips 2515 by way of wire-bonds, as are the bottom leads 2542 which interconnect the passive chips 2515 to the lower chip carrier 2518. FIG. 31 illustrates a further variation in which the upper chip carrier 2630 also has a plurality of chips 2614 mounted thereto.

Figure 32:
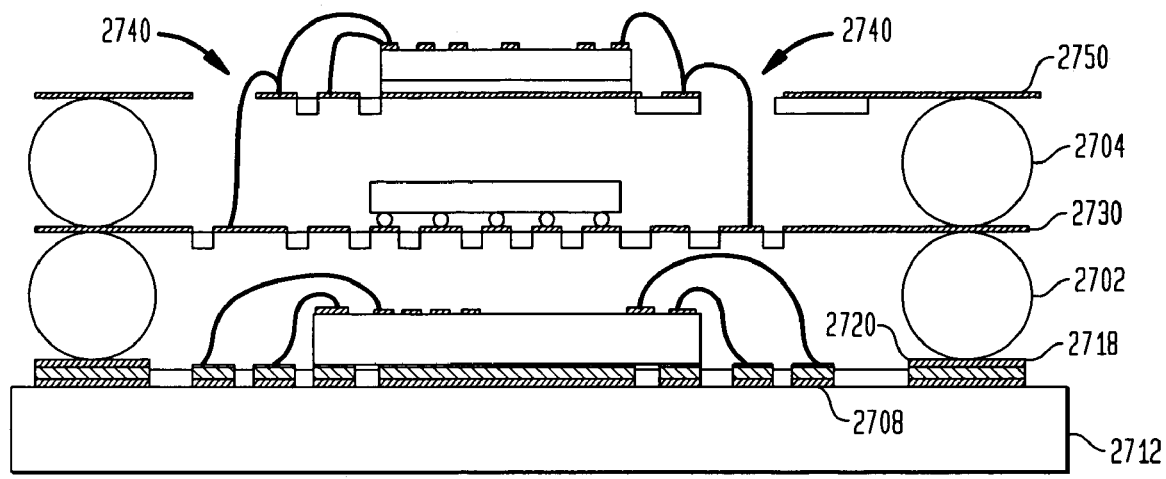
FIGS. 32 and 33 are diagrammatic sectional views of packaged chips according to still other embodiments of the invention.
Figure 33:
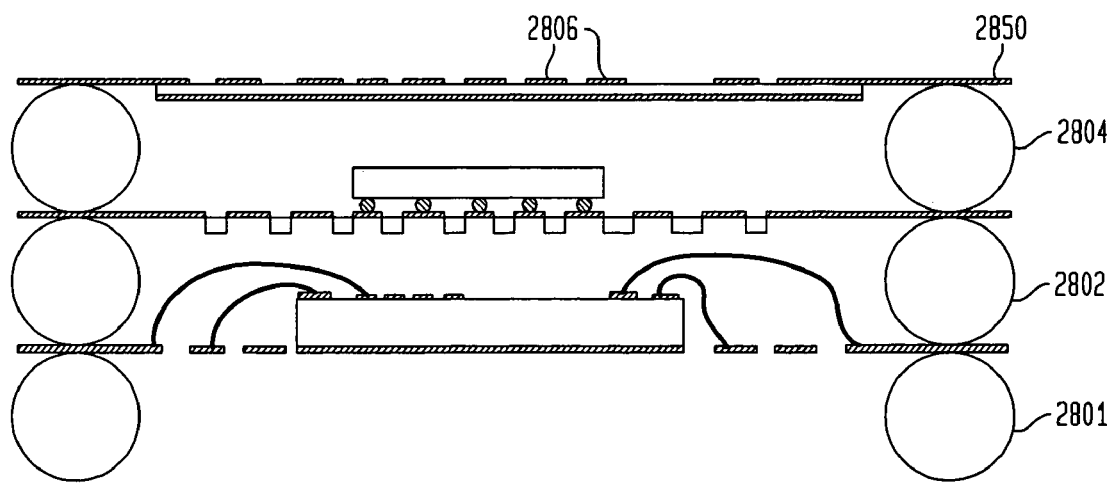

FIGS. 32 and 33 illustrate embodiments in which a plurality of chip carriers are provided having chips mounted thereto. The chip carriers are conductively connected by way of large solder balls 2702 which extend between a metal layer 2720 on the top side of a lower chip carrier 2718 and a metal layer on the bottom side of a middle chip carrier 2730. Similarly, conductive interconnection is provided by large solder balls 2704 which extend between the metal layer on the top side of the middle chip carrier 2730 and a metal layer on the bottom side of an upper chip carrier 2750. The assembly is mounted to a circuit board 2712 having patterns 2708 thereon. The conductive interconnection provided by the large solder balls 2702, 2704 can be merely for ground or common plane support, or, alternatively, for transfer of signals between devices on the lower, middle and upper chip carriers. As further shown in FIG. 32, conductive interconnections are provided in form of wire-bonds between the upper chip carrier 2750 and the middle chip carrier 2730. Bond windows 2740 in the upper chip carrier 2750 are provided for that purpose.

The large solder balls 2702, 2704 also assist in substantially blocking radiative propagation of radio frequency energy from devices lying between the respective chip carriers and the space external thereto. In addition, the middle and upper chip carriers can be provided with ground planes to assist in blocking radiation. With particular reference to FIG. 33, a ground plane is provided below an antenna formed by conductive patterns 2806 of the upper chip carrier 2850. In such embodiment, additional solder balls 2801 are provided on an underside of the lower chip carrier, for interconnection with a circuit panel, for example.

In another embodiment, instead of large solder balls 2702, 2704, 2802, 2804, conductive pillars can be provided (not shown) for interconnecting the respective chip carriers. In such embodiment, the pillars have a generally cylindrical or frustro-conical shape, or alternatively, a polygonal cross-section.

In the embodiments discussed above, use of a connecting element in the form of a circuit panel separate from the integrated passive chip provides significant economic advantages. The circuit panel has a lower cost per unit area. However, in a further variant, the features and methods discussed above can be employed in arrangements where a passive chip serves as the connecting element. For example, the lead frames discussed above can be used in such embodiments.

As these and other variations and combinations of the features discussed above can be utilized without departing from the present invention, the foregoing discussion of the preferred embodiment should be taken by way of illustration rather than by way of limitation of the present invention.

The invention claimed is:

1. A microelectronic package comprising:
   (a) at least one lower chip;
   (b) a connecting element extending above said at least one lower chip and extending in at least one horizontal direction beyond said at least one lower chip;
   (c) a bottom plane element defining at least a portion of a bottom surface of the package below said at least one lower chip and including a plurality of terminals exposed at said bottom surface and a thermal conductor exposed at said bottom surface, said thermal conductor having area larger than the area of each of said terminals, said thermal conductor being at least partially aligned with said at least one lower chip, at least some of said terminals being electrically connected to at least some of said contacts of said at least one lower chip by said connecting element, said terminals including a plurality of active terminals, and a plurality of active leads projecting upwardly from said active terminals to said connecting element.

2. A package as claimed in claim 1 wherein said connecting element includes at least one dielectric layer and conductive traces extending along said at least one dielectric layer, at least some of said terminals being connected to at least some of said contacts of said least one lower chip by said traces.

3. A package as claimed in claim 1 wherein said active leads are formed integrally with said active terminals.

4. A package as claimed in claim 3 wherein said active leads are thicker than said traces.

5. A package as claimed in claim 1 wherein said bottom plane element includes one or more ground busses substantially coplanar with said thermal conductor.

6. A package as claimed in claim 3 further comprising ground leads formed integrally with said ground busses projecting upwardly from said ground busses to said connecting element.

7. A package as claimed in claim 5 wherein said ground buses are spaced laterally from said thermal conductor and said bottom plane element includes ground struts extending between said thermal conductor and said ground busses.

8. A package as claimed in claim 3 wherein said thermal conductor has a plurality of edges, said one or more ground busses extending alongside one or more edges of said thermal conductor, said active contacts being disposed in one or more rows alongside one or more other edges of said thermal conductor.

9. A microelectronic package comprising:
   (a) a connecting element including a dielectric element and traces extending along said dielectric element, said connecting element having top and bottom surfaces;
   (b) at least one lower chip mounted to said bottom surface of said connecting element, said at least one lower chip having a surface remote from said connecting element defining a lower datum at a level below said connecting element;
   (c) a plurality of active terminals disposed at or below said lower datum; and
   (d) a plurality of active leads in the form of elongated strips extending between said active terminals and said connecting element, said active leads being connected to at least some of said traces, at least some of said active leads being thicker than said traces.

10. A package as claimed in claim 9 further comprising a mass of encapsulant covering said connecting element and said at least one lower chip, said active leads being embedded in said encapsulant.

11. A package as claimed in claim 10 wherein said mass of encapsulant defines a bottom surface at or below said lower datum, said active terminals being exposed at said bottom surface of the mass.

12. A package as claimed in claim 11 wherein said mass of encapsulant defines edge surfaces extending upwardly from said bottom surface, said active terminals being disposed at said edge surfaces.

13. A package as claimed in claim 9 further comprising at least one upper chip mounted to said top surface of said connecting element.

14. A package as claimed in claim 9 wherein said traces are less than 40 µm thick and said active leads are at least 50 µm thick.

15. A package as claimed in claim 1 wherein said bottom plane element further includes a bottom plane dielectric layer, said terminals being attached to said bottom plane dielectric layer.

16. A package as claimed in claim 1 further comprising at least one upper chip mounted to said top surface of said connecting element.

17. A package as claimed in claim 16 wherein said at least one upper chip is an integrated passive chip including one or more passive components, and wherein said passive chip has horizontal dimensions smaller than the horizontal dimensions of said connecting element.

18. A package as claimed in claim 17 wherein said at least one lower chip is an active RF chip.

* * * * *

UNITED STATES PATENT AND TRADEMARK OFFICE
CERTIFICATE OF CORRECTION

PATENT NO. : 7,176,506 B2  Page 1 of 1
APPLICATION NO. : 10/746810
DATED : February 13, 2007
INVENTOR(S) : Masud Beroz et al.

It is certified that error appears in the above-identified patent and that said Letters Patent is hereby corrected as shown below:

Column 1, line 56 "RF chips" are used" should read -- "RF chips", are used --.
Column 2, line 39 "are-substantially" should read -- are substantially --.
Column 4, line 22 "package elements have" should read -- package elements has --.
Column 4, line 61 "package elements have" should read -- package elements has --.
Column 7, line 63 "in which ever" should read -- in which-ever --.
Column 12, line 19 "provided between" should read -- are provided between --.
Column 13, line 12 "joined assembly is" should read -- joined assembly are --.
Column 18, line 28 "elements such a" should read -- elements such as a --.
Column 20, line 8 "panel provides thermal" should read -- panel provide thermal --.
Column 23, line 16 "1938 to a thermal" should read -- 1938, to a thermal --.
Column 25, line 33 "2202 are blocked" should read -- 2202 is blocked --.
Column 27, line 38 "having area larger" should read -- having an area larger --.
Column 27, line 51 "of said least" should read -- of said at least --.

Signed and Sealed this

Eleventh Day of March, 2008

JON W. DUDAS
*Director of the United States Patent and Trademark Office*